(12) United States Patent
Southworth et al.

(10) Patent No.: US 6,708,135 B2
(45) Date of Patent: Mar. 16, 2004

(54) METHOD FOR PROGRAMMING TIMER TO EXECUTE TIMING OPERATIONS

(75) Inventors: Robert A. Southworth, Phoenix, NY (US); Kenneth C. Volz, West Monroe, NY (US); Robert C. Morris, Jr., Pennellville, NY (US); Dan S. Carroll, Baldwinsville, NY (US)

(73) Assignee: ABB, Inc., Wickliffe, OH (US)

( * ) Notice: Subject to any disclaimer, the term of this patent is extended or adjusted under 35 U.S.C. 154(b) by 2 days.

(21) Appl. No.: 10/037,404

(22) Filed: Jan. 4, 2002

(65) Prior Publication Data

US 2002/0152412 A1 Oct. 17, 2002

Related U.S. Application Data

(60) Provisional application No. 60/259,920, filed on Jan. 5, 2001, and provisional application No. 60/260,002, filed on Jan. 5, 2001.

(51) Int. Cl.[7] .................................................. G06F 1/12
(52) U.S. Cl. ...................................................... 702/176
(58) Field of Search ........................... 702/176; 700/12; 340/870; 710/1; 379/102; 713/168

(56) References Cited

U.S. PATENT DOCUMENTS 4,314,329 A * 2/1982 Crewe et al. ................. 700/12
4,568,934 A * 2/1986 Allgood .................. 340/870.02
5,307,463 A   4/1994 Hyatt et al.
5,600,711 A   2/1997 Yuen
5,915,026 A   6/1999 Mankovitz

OTHER PUBLICATIONS

903 Machine Design, vol. 54 (1982) May, No. 11, Cleveland, Ohio, USA.

* cited by examiner

Primary Examiner—John Barlow
Assistant Examiner—Tung S Lau
(74) Attorney, Agent, or Firm—Wall Marjama & Bilinski LLP

(57) ABSTRACT

In the present invention, several timer functions (e.g. delay on make, delay on break, recycle, single shot, etc.) are expressed in terms of a series of timer subfunctions, and code segments are developed for each identified subfunction. A program of a timer is established to include a plurality of subfunction code segments and a subfunction ordering table for determining the ordering of execution for the subfunction code segments. The ordering of subfunctions of the subfunction ordering table may be selectable in accordance with a model number input received at a program builder system adapted for use in programming the programmable timer. In one embodiment, the programming method provides for reprogramming of a timer including a control circuit having a one-time programmable processor.

105 Claims, 19 Drawing Sheets

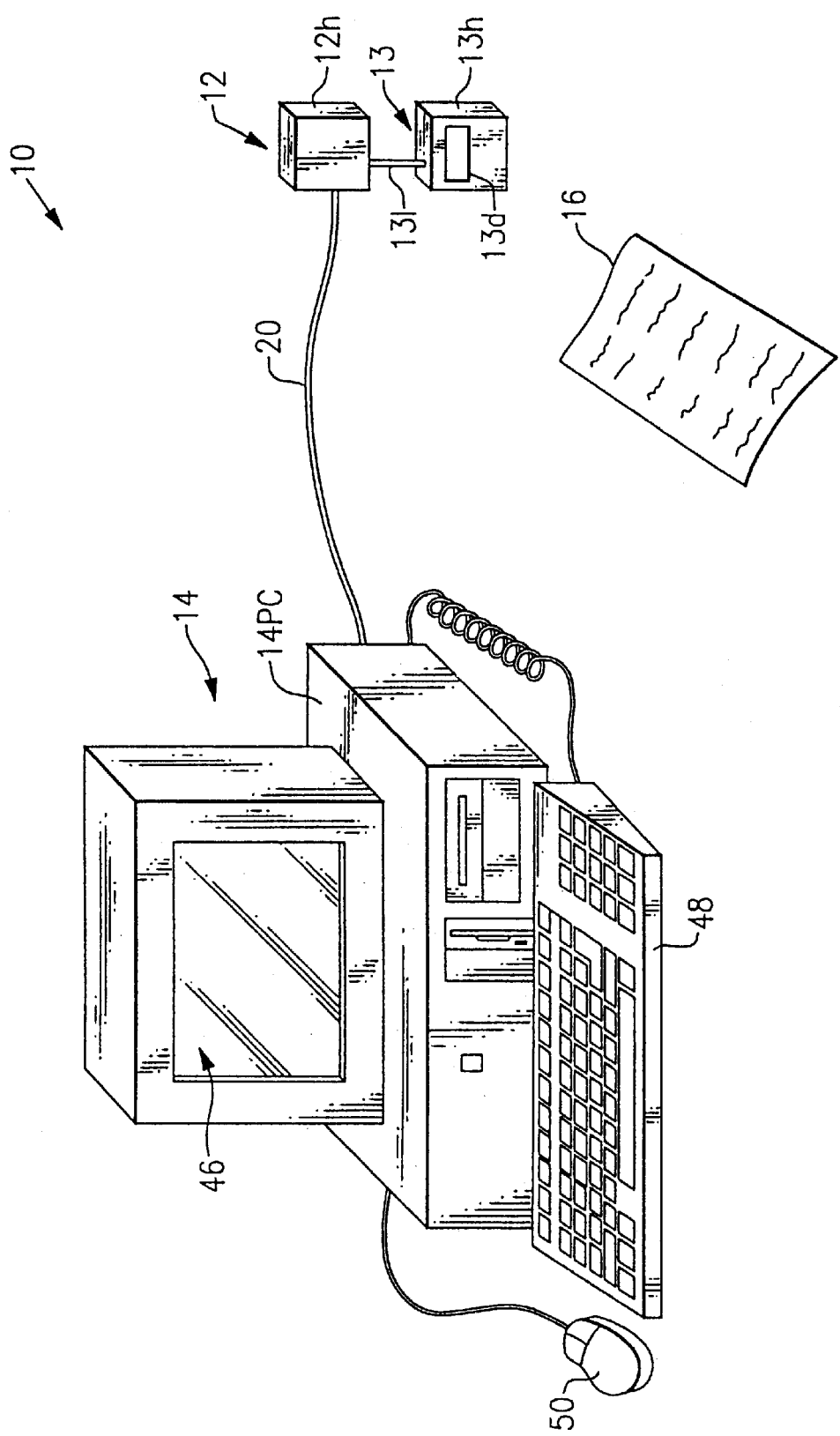

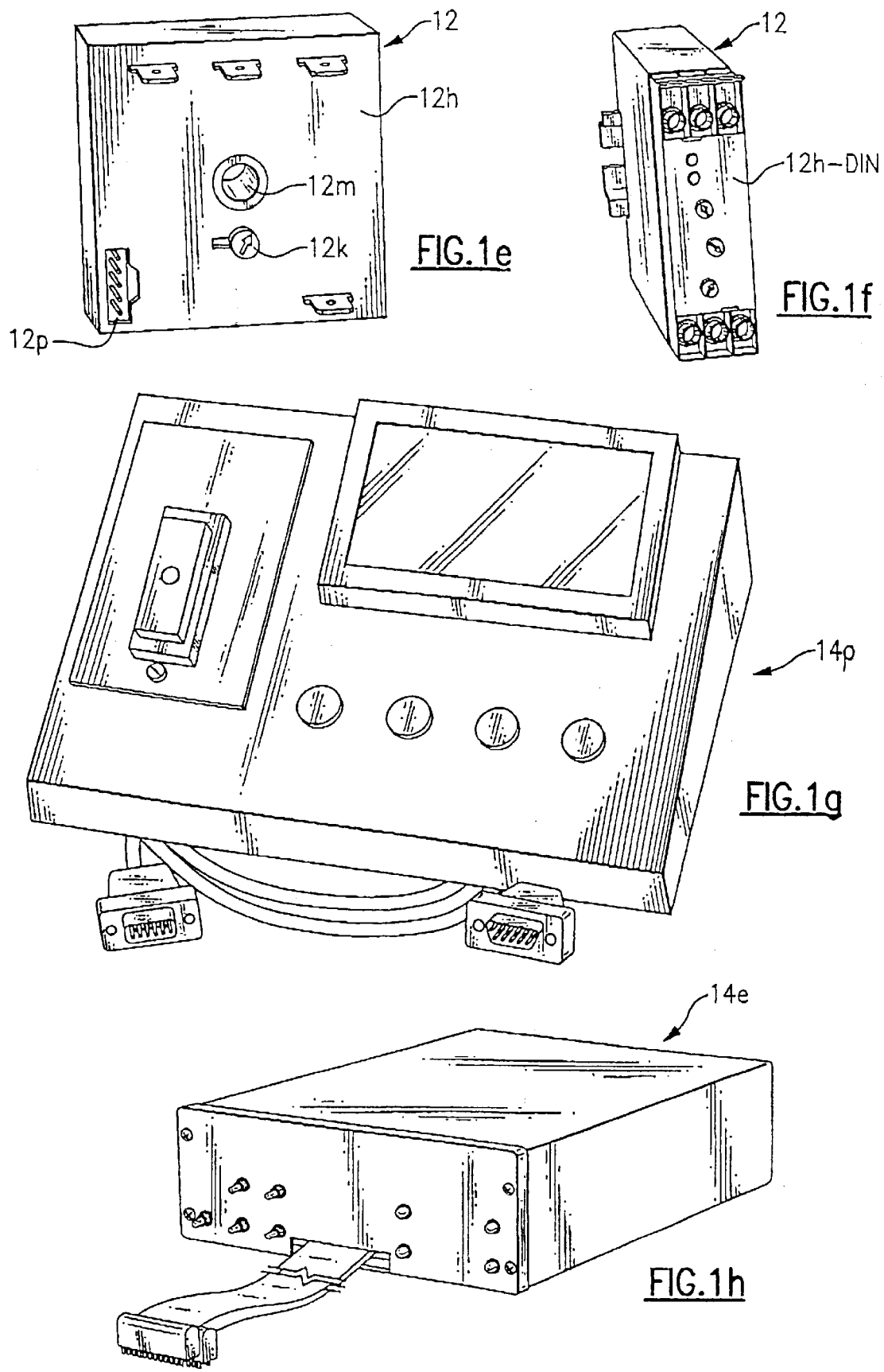

| MODEL NUMBER | SUPPLY VOLTAGE | TIMER FUNCTION | TIME DELAY FUNCTION | FIXED TIME DELAY | TIMING RANGE |
|---|---|---|---|---|---|
| XXX | 120VAC | DELAY ON MAKE | FIXED | 10s | — |
| XXY | 120VAC | DELAY ON MAKE | FIXED | 20s | — |
| XXZ | 120VAC | DELAY ON BREAK | FIXED | 10s | — |
| YXX | 230VAC | DELAY ON MAKE | FIXED | 10s | — |
| YXY | 230VAC | DELAY ON MAKE | FIXED | 20s | — |
| YXZ | 230VAC | DELAY ON BREAK | FIXED | 10s | — |
| ZXX | 120VAC | DELAY ON MAKE | ADJUSTABLE | — | 0–10s |
| ZXY | 120VAC | DELAY ON MAKE | ADJUSTABLE | — | 0–20s |
| ZXZ | 120VAC | DELAY ON BREAK | ADJUSTABLE | — | 0–10s |
| XYX | 230VAC | DELAY ON MAKE | ADJUSTABLE | — | 0–10s |
| XYY | 230VAC | DELAY ON MAKE | ADJUSTABLE | — | 0–10s |
| XYZ | 230VAC | DELAY ON BREAK | ADJUSTABLE | — | 0–10s |

FIG.3a

DELAY ON MAKE

M- DELAY ON MAKE: UPON APPLICATION OF INPUT VOLTAGE, THE TIME DELAY BEGINS. THE OUTPUT IS DE-ENERGIZED BEFORE AND DURING THE TIME DELAY. AT THE END OF THE TIME DELAY, THE OUTPUT ENERGIZES AND REMAINS ENERGIZED UNTIL INPUT VOLTAGE IS REMOVED. RESET: REMOVING INPUT VOLTAGE RESETS THE TIME DELAY AND OUTPUT.

DELAY ON BREAK

B- DELAY ON BREAK: INPUT VOLTAGE MUST BE APPLIED BEFORE AND DURING TIMING. UPON CLOSURE OF THE INITIATE SWITCH S1, THE OUTPUT ENERGIZES. THE TIME DELAY BEGINS WHEN S1 IS OPENED. THE OUTPUT REMAINS ENERGIZED DURING TIMING. AT THE END OF THE TIME DELAY, THE OUTPUT DE-ENERGIZES. THE OUTPUT WILL NOT ENERGIZE IF S1 IS CLOSED WHEN INPUT VOLTAGE IS APPLIED. RESET: RECLOSING S1 DURING TIMING RESETS THE TIME DELAY. REMOVING INPUT VOLTAGE RESETS THE TIME DELAY AND OUTPUT.

INTERVAL

I- INTERVAL: UPON APPLICATION OF INPUT VOLTAGE, THE OUTPUT ENERGIZES AND THE TIME DELAY BEGINS. AT THE END OF TIME DELAY, THE OUTPUT DE-ENERGIZES AND REMAINS DE-ENERGIZED UNTIL INPUT VOLTAGE IS REMOVED. RESET: REMOVING INPUT VOLTAGE RESETS THE TIME DELAY AND THE OUTPUT.

TRAILING EDGE SINGLE SHOT

TS- TRAILING EDGE SINGLE SHOT: INPUT VOLTAGE MUST BE APPLIED BEFORE AND DURING TIMING. WHEN THE INITIATE SWITCH S1 OPENS, THE OUTPUT ENERGIZES. AT THE END OF THE TIMING DELAY, THE OUTPUT DE-ENERGIZES. RECLOSING OR OPENING S1 DURING TIMING HAS NO AFFECT ON THE TIME DELAY. THE OUTPUT WILL NOT ENERGIZE IF S1 IS OPENED WHEN INPUT VOLTAGE IS APPLIED. RESET: RESET OCCURS WHEN THE TIME DELAY IS COMPLETE AND S1 IS CLOSED. REMOVING INPUT VOLTAGE RESETS THE TIME DELAY AND OUTPUT.

PCSP MODULE
KSPS PROGRAMACUBE™ TIMING MODULE

ACCUMULATIVE DELAY ON MAKE

AM- ACCUMULATIVE DELAY ON MAKE: INPUT VOLTAGE MUST BE APPLIED BEFORE AND DURING TIMING. THE OUTPUT IS DE-ENERGIZED BEFORE AND DURING THE TIME DELAY. EACH TIME THE INITIATE SWITCH S1 IS CLOSED, THE TIME DELAY PROGRESSES; WHEN IT OPENS, TIMING STOPS. WHEN THE AMOUNT OF TIME S1 IS CLOSED EQUALS THE FULL TIME DELAY, THE OUTPUT ENERGIZES AND REMAINS ENERGIZED UNTIL RESET. RESET: REMOVING INPUT VOLTAGE RESETS THE TIME DELAY AND THE OUTPUT.

FIG.3b(1)

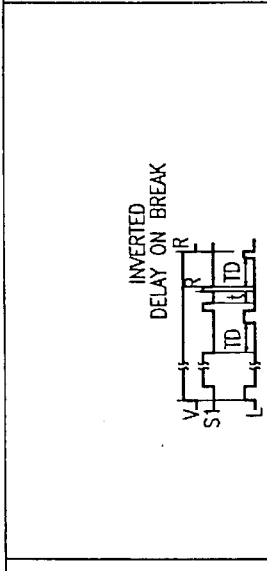
FIG.3b(2)

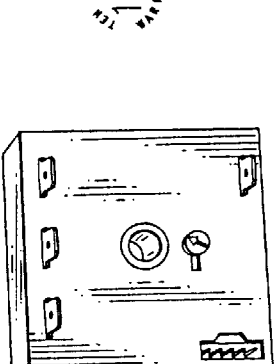
FIG.3b(3)

| TECHNICAL DATA | |
|---|---|
| TIME DELAY | |
| TYPE | MICROCONTROLLER CIRCUITRY |
| RANGE | 0.1s...1000H IN 9 ADJUSTABLE RANGES OR FIXED |
| REPEAT ACCURACY | +/-1% OR 16ms AT 60Hz, 20ms AT 50Hz, WHICHEVER IS GREATER |
| TOLERANCE (FACTORY CALIBRATION) | ≤ +/-2% |
| RECYCLE TIME | ≤ 250ms |
| INITIATE TIME | = 40ms |
| TIME DELAY vs. TEMPERATURE & VOLTAGE | ≤ +/-2% |
| INPUT | |
| VOLTAGE | 12,24,OR 120 VDC; 24,120,OR 120/230VAC |
| TOLERANCE | ≤ +/-15% |
| LINE FREQUENCY | 50..60Hz |
| POWER CONSUMPTION (DC VOLTAGES) | ≤ 1W |
| OUTPUT | |
| TYPE | SOLID STATE OUTPUT |
| RANGE | 1A STEADY, 10A IN RUSH FOR 16ms AT 60°C |
| VOLTAGE DROP | = 2.5V AT 1A |
| PROTECTION CIRCUITRY | ENCAPSULATED |
| DIELECTRIC BREAKDOWN | ≥2000VRMS TERMINALS TO MOUNTING SURFACE |
| INSULATION RESISTANCE | ≥100MΩ |
| POLARITY | DC UNITS ARE REVERSE POLARITY PROTECTED |
| MECHANICAL | |
| MOUNTING | SURFACE MOUNT WITH ONE #10(4.5x0.8)SCREW |
| PACKAGE | 2x2x 1.21in.(50.8x50.8x30.7mm) |
| TERMINATION | 0.28in. (6.35mm)MALE QUICKCONNECT TERMINALS |
| ENVIRONMENTAL | |
| OPERATING TEMPERATURE | -40°C...+60°C |
| STORAGE TEMPERATURE | -40°C...+85°C |
| HUMIDITY | 95% RELATIVE, NON-CONDENSING |
| WEIGHT | =2.4oz(68g) |

R SELECTION CHART

| DESIRED TIME DELAY* | | | | | | | | | | $R_T$ |
|---|---|---|---|---|---|---|---|---|---|---|
| SECONDS | | | MINUTES | | | HOURS | | | | KΩ |
| 1 | 2 | 3 | 4 | 5 | 6 | 7 | 8 | 9 | | |
| 0.1 | 1 | 10 | 0.1 | 1 | 10 | 0.1 | 1 | 10 | | 0 |
| 1 | 10 | 100 | 1 | 10 | 100 | 1 | 10 | 100 | | 10 |
| 2 | 20 | 200 | 2 | 20 | 200 | 2 | 20 | 200 | | 20 |
| 3 | 30 | 300 | 3 | 30 | 300 | 3 | 30 | 300 | | 30 |
| 4 | 40 | 400 | 4 | 40 | 400 | 4 | 40 | 400 | | 40 |
| 5 | 50 | 500 | 5 | 50 | 500 | 5 | 50 | 500 | | 50 |
| 6 | 60 | 600 | 6 | 60 | 600 | 6 | 60 | 600 | | 60 |
| 7 | 70 | 700 | 7 | 70 | 700 | 7 | 70 | 700 | | 70 |
| 8 | 80 | 800 | 8 | 80 | 800 | 8 | 80 | 800 | | 80 |
| 9 | 90 | 900 | 9 | 90 | 900 | 9 | 90 | 900 | | 90 |
| 10 | 100 | 1000 | 10 | 100 | 1000 | 10 | 100 | 1000 | | 100 |

** WHEN SELECTING AN EXTERNAL R $R_T$ ADD AT LEAST 15% FOR TOLERANCE OF UNIT AND THE R $R_T$

INCHES(MILLIMETERS)

≤1.21 (30.7)
0.75 (19)
2.00 (50.8)
2.00 (50.8)
0.25 (6.35)
0.25 (6.35)
F=COVER(FACTORY USE ONLY)

ACCESSORIES

EXTERNAL ADJUST POTENTIOMETER
P/Ns: YP100495(FtGA)
YP100495X(FtGB)

FEMALE QUICK CONNECT
P/N: YP101564(AWG14/16)

QUICKCONNECT TO SCREW ADAPTER P/N: YP101518

VERSA-KNOB P/N: YP07007

DIN RAIL YC103PW

DIN RAIL ADAPTOR YP102320

SEE ACCESSORY PAGES AT THE END OF THE SECTION.

METHOD FOR PROGRAMMING TIMER TO EXECUTE TIMING OPERATIONS

CROSS REFERENCE TO RELATED APPLICATION

This application claims the priority of the following provision applications: U.S. patent application Ser. No. 60/259,920 filed on Jan. 5, 2001, entitled "Programmable Timer Module System," and U.S. patent application Ser. No. 60/260,002, filed on Jan. 5, 2001, entitled "Programmable Timer Module," the contents of which are relied upon and incorporated herein by reference in their entirety, and the benefit of priority under 35 U.S.C. § 119(e) is hereby claimed.

FIELD OF THE INVENTION

The invention relates to generally to methods for programming processor-based devices, and specifically a method for programming a timer to execute timing operations.

BACKGROUND OF THE PRIOR ART

Timers are required to perform a variety of different functions depending on the applications for which they are employed. "Delay on make" timers commence timing when an initiate contact is closed and have an "off" output during timing. "Delay on break" timers commence timing when an initiate contact is open and have an "on" output during timing. "Recycling timers" have an output that switches between an "off" and "on" state during timing. "Interval" and "single shot" timers commence timing when an initiate contact is closed and have an output in an "on" position during timing. Timers also have various power ratings. Timers are adapted for use in all different classes of electrical circuits including low voltage DC, high voltage DC, low voltage AC, and high voltage AC.

In addition, timers have different time delay functions and settings. Some timers have fixed time delays while other timers have adjustable time delays. Timers that have adjustable time delays have specified timing ranges while timers that have fixed time delays have specified time delays.

Manufacturers have addressed the need for timers having various timer functions, voltage ratings, time delay functions, and timing settings by making available to users a wide variety of different uniquely configured timer models. These timer models have different combinations of circuit elements for each model. Because of the large number of possible combinations of functions, ratings, and settings, manufacturers must design and produce a large number of different timer models to satisfy the needs of its users, each of the models having a unique combination of circuit elements. In its December 2000 website, Borg General Controls, Inc., advertises that it has made over 400 different timer models available. Manufacturing a large number of unique circuits results in high engineering costs and high manufacturing costs.

There is a need to address the demand for timers having varying functions, ratings, and settings more efficiently.

SUMMARY OF THE INVENTION

According to its major aspects and broadly stated the present invention relates to a method for programming a programmable timer.

According to the invention, several timer functions (e.g. delay on make, delay on break, recycle, single shot, etc.) are expressed in terms of a series of timer subfunctions, and code segments are developed for each identified subfunction. A program of a timer is established to include a plurality of subfunction code segments and a subfunction ordering table for determining the ordering of execution for the subfunction code segments. The ordering of subfunctions of the subfunction ordering table may be selectable in accordance with a model number input received at a program builder system adapted for use in programming the programmable timer. In one embodiment, the programming method provides for reprogramming of a timer including a control circuit having a one-time programmable processor.

In another aspect, the invention relates to a timer module system including a timer module and a program builder system for programming the timer module.

The timer module includes circuit elements configured for control by a timer processor system so that various timer functions, time delay functions, and time delay settings are realized by appropriate programming of the timer processor system. The program builder system includes a builder processor system having a program for developing a timer operating program in response to a user-input model number command selected using the model number data page. A breakable communication link is provided between the timer module and the program builder system to facilitate the transmission of developed timer operating programs from the program builder system to the timer module.

The timer module may include a power supply circuit unit, an initiate circuit unit, and an output circuit unit all in communication with the timer processor system. The timer module may also comprise a resistance varying adjustment mechanism in communication with the processor system for providing manual time delay adjustment. Further included in the timer module is a communication port facilitating communication with the program builder system.

A standardly known computer system such as a personal computer or hand-held computer having a user interface such as a keyboard or graphical user interface or voice interface and a processor system having stored therein a program developing program may serve as the program builder system. In a preferred embodiment, the program builder system is configured to be responsive to a model number input by a user. In response to a model number input, the program builder system develops a timer operating program corresponding to the selected number. Further in response to a transmit command by a user, the program builder system transmits the developed timer operating program to a timer module to configure the timer module in accordance with the timer function, time delay function, and time delay or range setting requirements corresponding to the selected model number.

In another aspect of the invention, a model number data page is made available to a user in order to facilitate the selection of a model number for input into the program builder. The model number data page correlates available model numbers with operating parameters including timer function parameters, time delay function parameters and time delay and range setting parameters associated with the various timer model numbers. After timer functions, time delay functions, and time delay and range settings requirements are determined for a timer module, a user selects the model number from the model number data page corresponding to the determined timer functions, time delay functions, and timing setting requirements.

The program builder system can be located either at the place of business of a supplier (such as a manufacturer or distributor) or the place of business of a customer business. In the case the program builder system is located at a supplier's place of business, then a model number data page may be provided to a customer for use in selecting an appropriate model number for a certain application. When the customer selects the model number using the model number data page, the customer communicates the model selection to a supplier who appropriately programs the timer module in accordance with the selected model number. The term "place of business of a supplier" shall refer herein to any location under the control of a supplier. The term "place of business of a customer" shall refer herein to any location under the control of a customer.

It will be understood that a business entity can be either or both a supplier and a customer as referred to herein. For example, a distributer who buys e.g. module 12 from a manufacturer of module 12 and sells module 12 to an end user is a customer with respect to the manufacturer/supplier and a supplier with respect to the end user/customer.

In addition, the program builder system can be located partially at a supplier's place of business and partially at a customer's place of business. For example, a program developing processor system of the program builder system can be located at a supplier's place of business and program transmission processor system of the program builder system can be located at customer's place of business, together with an unprogrammed timer module. In this embodiment, a customer selects a timer model number using a model number data page, and communicates the selection to a supplier who builds an appropriate timer program using the program developing processor system. The supplier then delivers the program via a communication link such as an internet link or by shipping a storage device having the program stored timer to the customer, who transmits the program to the timer module using the program transmission processor system.

These and other details, advantages and benefits of the present invention will become apparent from the detailed description of the preferred embodiment hereinbelow.

BRIEF DESCRIPTION OF THE DRAWINGS

Other objects and advantages of the invention will be apparent from the following description and drawings, in which:

FIG. 1a is a physical schematic diagram of one embodiment of a timer module system according to the invention;

FIGS. 1e–1f show various housing styles for housing an exemplary timer module according to the invention;

FIGS. 1g and 1h show exemplary devices which may be incorporated as part of a program building system according to the invention;

FIG. 3a shows an embodiment of possible model number data pages according to the invention;

FIG. 3b shows an embodiment of model data page according to the invention in which model number characters designate timer operating parameters;

DETAILED DESCRIPTION OF THE INVENTION

Figure 1B:
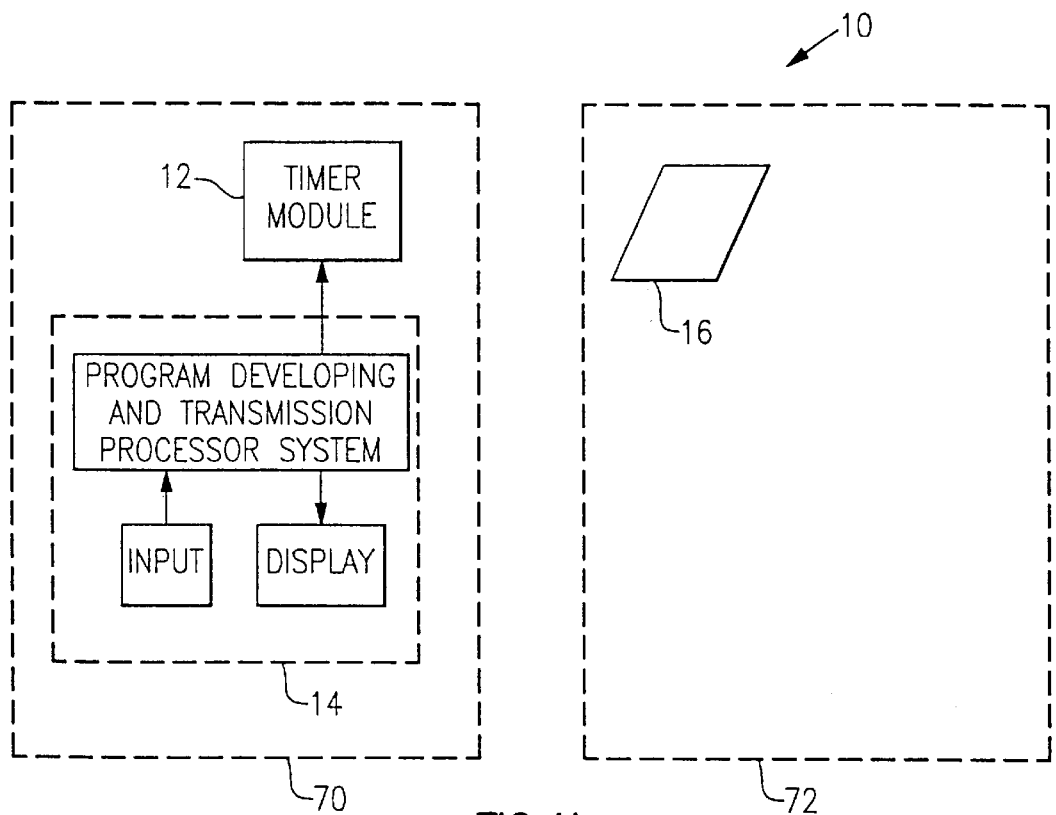
FIGS. 1b–1d show alternative plan block diagrams of various timer module systems according to the invention.

Shown in FIG. 1a, the present invention is a timer module system 10 including a timer module 12, a program builder system 14 for developing programs for loading into the timer module 12 and a model number data page 16. As will be explained further herein, timer module 12 includes circuit elements configured for control by a timer processor system so that various timer functions, time delay functions, and time delay ranges and settings are realized by appropriate programming of the timer processor system. Program builder system 14 includes a program developing processor system having a program for developing timer operating programs in response to user-initiated commands and a transmission processor system for transmitting developed programs to a timer module 12. A breakable communication link 20 is provided between program builder system 14 and timer module 12 to facilitate the transmission of developed timer operating programs from the program builder system to the timer module. Model number data page 16 facilitates the selection of an appropriate model number associated program for loading into timer module 12.

Figure 2A:
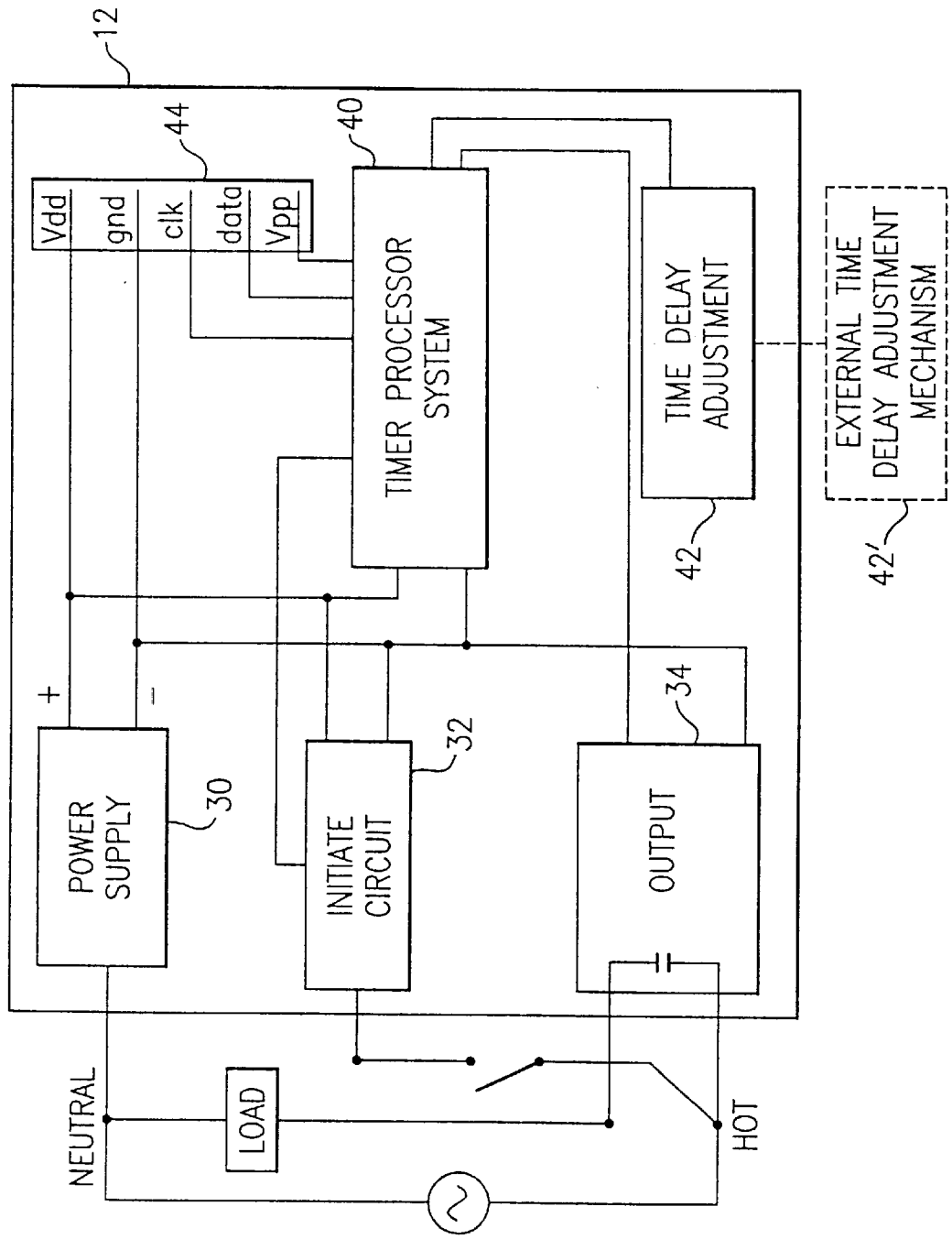
FIGS. 2a–2g show block and circuit diagrams of various embodiments of timer circuit modules according to the invention.
Figure 2B:
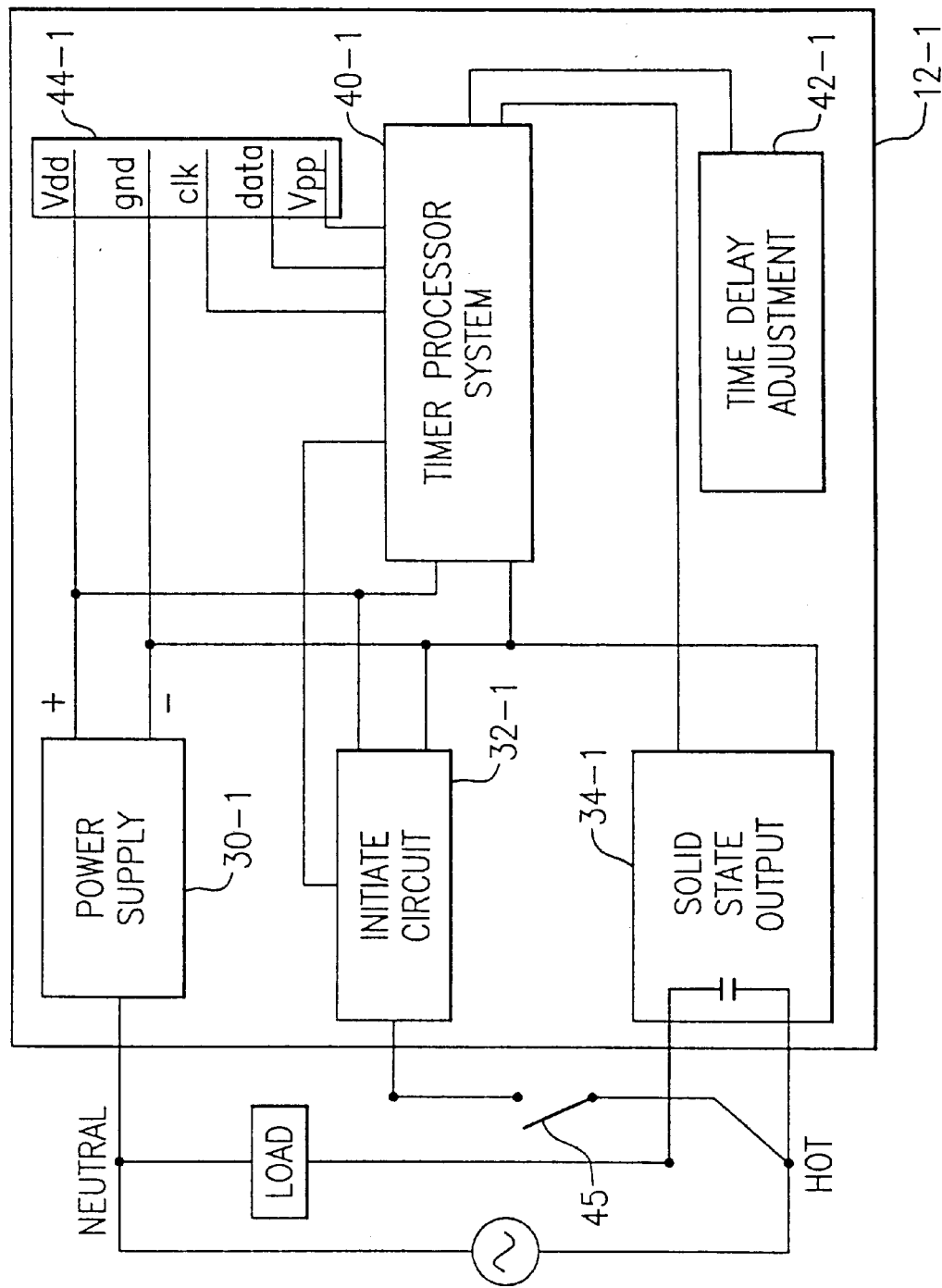

A block diagram of a timer module according to the invention is shown in FIG. 2a. Timer module 12 includes a power supply circuit unit 30, an initiate circuit unit 32, and an output circuit unit 34 all in communication with the timer processor system 40 typically comprising a microprocessor in communication with an integrated memory. The elements may be incorporated in a small, compact, rugged housing 12 has shown in FIG. 1a and FIG. 3b. As is indicated in FIG. 3b, timer module housing 12h, in one embodiment, may have the dimensions of 2"×2"×1.21". Timer module 12 may also comprise a time delay adjustment unit 42 typically having a resistance-varying adjustment mechanism in communication with the processor system 40 for manual time delay adjustment. Further included in the timer module 12 is a communication port 44 facilitating communication with the program builder system 14. Power supply 30 converts a line voltage supply into a DC voltage in order to power circuit units 32, 34, 40, and 42. Initiate circuit unit 32 determines the state of an external switch and delivers the state information to timer processor system 40. Output circuit unit 34 opens and closes a contact based on the status of an output control signal received from processor system 40.

Some standard housings for module 12 are shown in FIGS. 1e and 1f. FIG. 1e shows a "U.S.-style" timer module 12 including a center hole 12m for enabling mounting, a time delay adjustment knob 12k, and a communication port 12p for receiving a communication cable for facilitating communication with e.g. builder system 14 or reader module 13. FIG. 1f shows a DIN-style module housing 12h-DIN, which is common in Europe.

Of course, power supply circuit 30 can be replaced with a power supply that is not in communication with the power line in communication with initiate circuit unit 32 and output circuit unit 34. Further, it is common in timer circuits to delete initiate circuit 32. Standard refrigeration system timer circuits, for example, are active on power-up and do not require an initiate circuit. Still further, time delay adjustment circuit 42 can be in communication with a signal varying adjustment mechanism 42' external to module 12. Circuit unit 42 can be responsive to a varying signal from, for example, a thermistor, a pressure transducer, humidity sensor, a liquid level sensor and an optical sensor.

Timer module 12 can be adapted for implementation in a variety of useful applications by configuring module 12 to be in communication with a signal varying adjustment mechanism 42'.

For example, if signal varying adjustment mechanism 42' is provided by a negative temperature coefficient thermistor and module 12 is programmed to execute a recycling function to be described herein, a simple proportioning temperature control function can be achieved. In this application, the "ON TIME" would be fixed, the "OFF TIME" would vary based on temperature and the corresponding change in the thermistor resistance value. I.e.: at 20 degrees C., the thermistor might have a value of 900 K Ohms, yielding at time delay of 100 seconds OFF, 10 seconds ON (10% ON time). As the temperature rises, the resistance lowers to 20 K Ohms at 80 decrees C. The corresponding time delays would be 20 seconds OFF, 10 seconds ON (ON time is fixed). This would represent an ON time ration of 33% ON at 80 degrees C.

Continuing with reference to applications which may be implemented with use of module 12 in combination with mechanism 42', if signal varying adjustment mechanism 42' is provided by a photo-resistive element and module 12 is programmed to execute a recycling function, a time versus ambient light relationship can be achieved. This can be used to provide supplemental lighting in green house applications amongst others. In this application, the "ON TIME" would be adjustable and vary based on ambient light, the "OFF TIME" would be adjusted by way of a potentiometer. For example, at normal daylight, the photo resistor's value would be 1 K Ohm yielding an ON TIME of only 1 second per total cycle. The OFF TIME would be adjusted VIA potentiometer by the operator based on the application/plant species requirements. As the natural light diminishes, the resistance would increase on the photo resistive element, extending the ON TIME of the artificial lighting.

In another application which may be implemented with use of module 12 in combination with mechanism 42', signal varying adjustment mechanism 42' is provided by a variable resistance output pressure transducer so that module 12 provides variable timing based on pressure. As an example, a chemical metering application, which uses pressure to detect flow speed, could have the dispensing time altered based on pressure. As the resistance increases (indicating increased pressure and flow), the dispense time could be lengthened automatically.

In another example of an application which may be implemented with use of module 12 in combination with mechanism 42', adjustment mechanism 42' is provided by a conductive level sensor. A conductive level sensor adjustment mechanism can be disposed in communication with an oil chamber, for example. As contaminants enter an oil immersed pump motor chamber, the resistance of the fluid decreases. This detected resistance can be used with module 12 to shorten a maintenance timer's delay. For example, a Delay on Make Function may be set to delay for 1000 hours prior to turning on a light indicating routine maintenance is required on the pump. If a seal is ruptured and contaminants begin to mix with the fluid, the resistance of oil mix decreases, which in turn decreases the time delay. The end result is that the maintenance light illuminates earlier, and varies based on the level of contamination.

Specific embodiments of timer modules according to the invention are described with reference to FIGS. 2b–2g. A timer module having a solid state output circuit and two programmable time delays is described with reference to block and circuit diagrams of FIGS. 2b–2c. A timer module having a relay output circuit and two time delays is described with reference to the block diagram of FIG. 2d and the circuit diagram of FIG. 2e. A timer module having a solid state output circuit unit, two programmable time delays and a dip switch time delay manual adjustment mechanism is described with reference to the block diagram of FIG. 2f and the circuit diagram of FIG. 2g.

Timer module 12-1 is a programmable timer module with two adjustable time delays, an input switch, and a 1 ampere solid state output. These features combine to make the standard piece of hardware described above. Module 12-1 comprises two adjustable time delays, instead of the usual one time delay. The extra time delay allows the implementation of more complex timing functions, previously only available through a custom-designed products.

Module 12-1 along with, modules 12-2 and 12-3 to be described herein below are also adapted to allow an untimed load to be connected in parallel with the module's initiate circuit. Frequently, customers want to connect an un-timed load in parallel with the connection to a timer's initiate input. This feature would allow, for example, a light to turn on whenever a timer's initiate switch is closed (circuitry of module 12-1 allowing module 12-1 to operate with an un-timed load in parallel with the initiate input will be described herein).

Power supply 30-1 for the module 12-1 is designed to operate at 120 VAC and 230 VAC. The structure of power supply 30-1 is as follows. Diode, D101, is used as a half wave rectifier, forming an unfiltered DC voltage. Resistors R102 and R103 drop the voltage from line potential down to around the five volt range. Capacitor C102, resistor R106, and capacitor C3 form a double pole low pass filter that changes the half wave rectified voltage into filtered DC. Zener diode Z101 regulates the DC voltage to 5 VDC. This description applies for 230 VAC operation. At 230 VAC, both R102 and R103 are required to drop the voltage to acceptable levels. To allow the power supply current to pass through both R102 and R103, Q105 remains turned off during 230 VAC operation.

For 120 VAC operation, R103 is no longer needed. R2 provides enough resistance to drop the line voltage down to acceptable levels. NPN BJT transistor Q105 turns on during 120 VAC operation and diverts the power supply current around R103 and into the already described low pass filter. Resistors R105, R124, R128, R129, and R130; Zener diode Z102; and NPN BJT transistor Q106 control Q105. These circuit elements monitor the operating voltage and decide when there is sufficient operating voltage to turn Q105 off.

Q105 could also be controlled by a signal received from timer processor system 40-1. A timer module according to the invention can be adapted for use with various supply line voltages by providing sensing circuitry e.g. R105, R124, R128, R129, R130, Z102, Q106, Q105, which senses the line voltage of the line to which the timer module is connected as is described with reference to FIG. 2c or by providing a control signal in communication with the power supply circuit unit 40. The status of such a supply voltage rating control signal in communication with circuit unit 40 may vary depending upon the model number of the timer. For example, the selection of a first model number may result in circuit control element such as Q105 being on during operation of module 12-1, and the selection of a second model number may result in a circuit control element such as Q105 being off during operation of module 12-1. The selection of a model number having a certain supply voltage rating associated therewith may also result in a timer module being supplied to a customer that has a certain set of hardware components that adapt the module for operation at the specified voltage level.

Referring now to aspects of initiate circuit 32-1, the initiate circuit requires circuitry sufficient to allow the unit to determine when an external switch is closed. Typically, module 12-1 is adapted so that initiate switch 45 connects to the "hot" side of the line. Additionally, initiated circuit 32-1 is adapted so that an untimed load can be connected in parallel with initiate switch 45.

Initiate circuit 32-1 comprises resistors R104, R110, R111, R117, diodes D108, D109, capacitor C107, zener diode Z3, SCR Q102, and terminal T106. The external initiate switch 45 connects between terminals T102 and T106, with the "untimed load" wired between terminals T106 and T103. The operation of the circuit is as follows. With the initiate switch 45 open, it is desired to have no signal (logic low) out of the circuit, indicating that the switch is open. If the switch is closed, the circuit supplies a line frequency, 5 volt square wave to an input to the microcontroller. When the "hot" side of line is negative wrt "neutral," current flows from terminal T103 through resistor R104. From that point the current splits, and flows through both diodes D110 and R110. From diode D110, current continues through resistor R117 and flows to the collector of Q102, R120 and Z104. If Q102 is off, the current passes through R120 creating a voltage. Zener diode Z104 clips that voltage to 5V. Thus, when Q102 is off, there is an initiate signal.

Some of the current passing through diode D104 passes through resistor R110. If the initiate switch is closed, the current is shunted through D108 to terminal T102 which is the "hot" side of line in a negative half line cycle. If current is shunted through D108, Q102 stays off, and the situation described above occurs. An initiate signal is created. If the initiate switch is open, the current passes through D109 instead. It continues through Z103 and then through the b-e junction of Q102. This turns Q102 on. With Q102 on, the current intended to pass through R120 is shunted through c-e of Q102, keeping the initiate signal at 0 v.

The power to run the initiate circuit originates from terminal T3, or the "neutral" connection. Because the "untimed load" is also connected to neutral, there is no opportunity for feedback through the "untimed load."

Solid state output 34-1 comprises Q101, Q107, D102, D103, D104, D105, R101, R114, R115, R121, R122, C101, and C104. This section acts like a switch between terminals T101 and T102. The external load connected to the unit is connected between T101 and T103. When the switch is open, voltage is not applied to the load. When the switch is closed, voltage is applied. Neglecting Q107 for the moment, this section functions as follows. The SCR, Q101 acts as an open circuit between its anode and cathode before it receives trigger current to its gate. When the SCR is off, the load current cannot flow, and the output remains off. When the microcontroller 40-1 outputs a signal to turn on the solid state output, it applies voltage to R115, which sends current into the gate of the SCR. With a continuous flow of current into its gate, the SCR remains on. Now, AC current can flow from T102, through the full wave bridge rectifier made up of D102, D103, D104, and D105 and to the anode of Q101. Since Q101 is turned on, the load current continues through Q101 and out its cathode, back through the bridge and out T101 to the load. The full wave bridge allows Q101, which only allows current to flow in one direction, to be used to control AC current. Capacitor C101 and resistor R101 combine in series to form a snubber circuit. This snubber keeps the rate of rise of voltage (DV/DT) on Q101 slow enough so it does not exceed the part's specified maximum DV/DT rate. The snubber is especially important in noisy electrical environments, where voltage transients could exceed Q101's DV/DT rate and cause it to turn on when it should not.

Figure 2C:
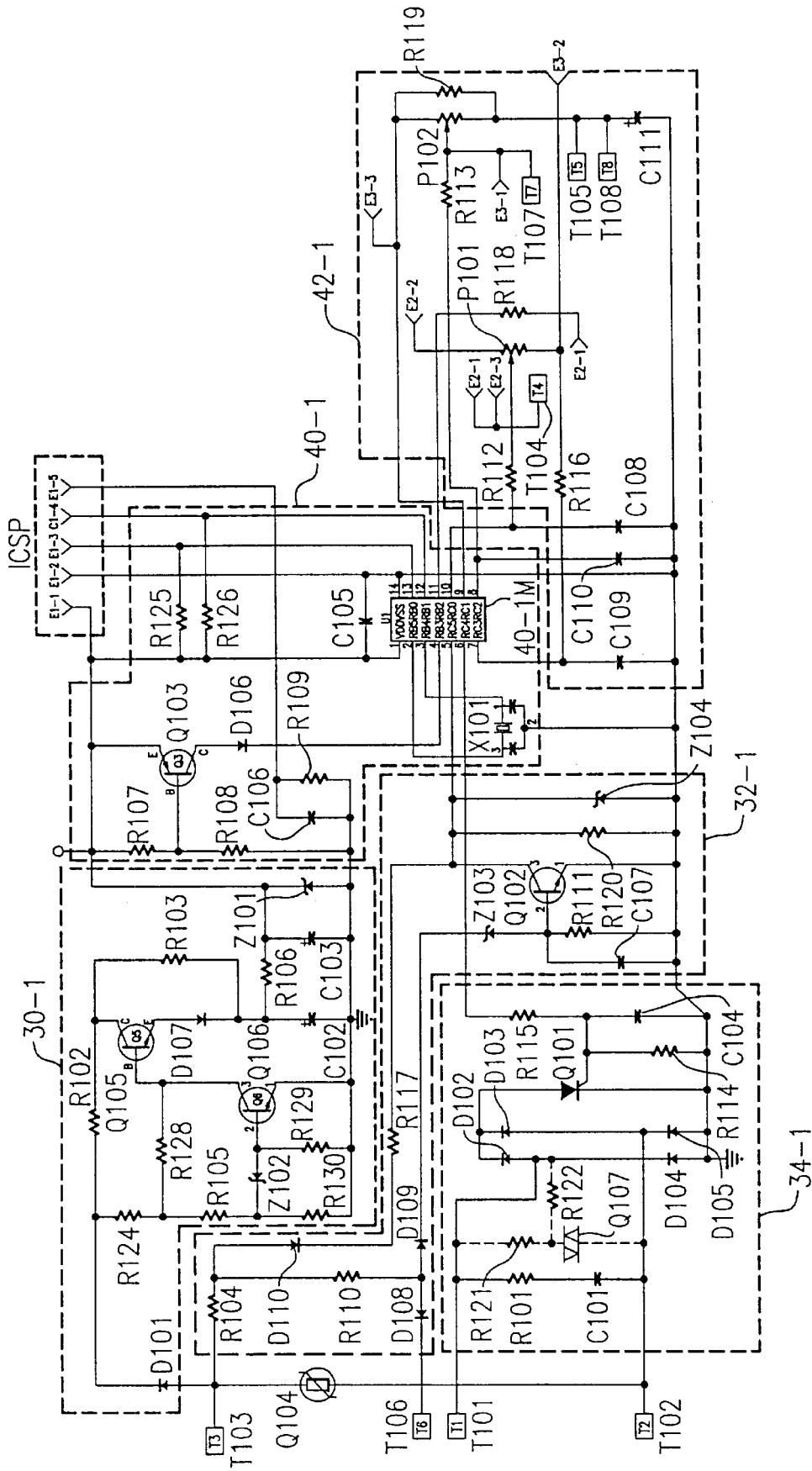

When a high current unit is ordered, Q107, R121, R122 can be added as are indicated by dashed-in elements Q107, R121, R122, of FIG. 2C. Q107 is a triac and can carry high currents. If Q107 is used, the bridge and SCR output no longer carries load current. Instead, it is used to supply the trigger current to turn on the triac, (Q107.

Time delay adjustment unit 42-1 includes circuitry in communication with, for example, board potentiometers, or external resistance to determine the user's desired time delay length. Microcontroller 40-1 in the particular example shown does not have an analog to digital converter, which would allow a direct read of the position of a potentiometer. Instead, a technique to allow a digital input to read an analog value is employed. The digital inputs have a threshold point where the voltage is high enough to change the microcontroller's reading of the input from logic low to logic high. Using this threshold allows reading an analog resistance value with a digital input. The circuit charges a capacitor through a known reference resistance, equivalent to the maximum value of the variable resistance to be read. The time it takes to charge the capacitor from 0 v to the threshold of the microcontroller's digital input is measured and stored. This process is repeated for the variable resistance to be measured. The time to charge through the variable resistance to be measured is then taken as a percentage of the time taken to charge through the reference resistance. The ratio method allows for the tolerances associated with the capacitance of the timing capacitor and the threshold of the digital input to be removed from the measurement as they are contained in both measurements and canceled out through the division process of the ratio.

Time delay adjustment circuit 42-1 comprises on board potentiometer P101 and capacitors C109, C110, C111, C112, resistors R112, and R116. Before the resistance reading routine occurs, microcontroller 40-1M sets RB2, RC0, RC1, RC2, and RC3 to output low to fully discharge the timing capacitor, C111. Once the timing capacitor is discharged, the next step is to measure the time to charge C111 through the resistance of the potentiometer, P101. The upper potentiometer pin connects to RB2 of microcontroller 40-1. This pin is set to output high, and a timer is started. All of the other pins associated with this section of circuitry are set to high impedance. Once in this state, current flows out of RB2 through the resistance of the entire potentiometer, and into C111. As current flows into C111, its voltage begins to rise. When the voltage on C111 reaches the logic high threshold of RC3 (configured as a digital input), the timer is stopped and the time is recorded in an integrated memory of microcontroller 40-1M. Next, the voltage on C111 is discharged to 0 v again and RC0, connected to the wiper of P101, is set to output high. All of the other pins associated with this section of circuitry are set to high impedance. Once in this state, current flows out of RC0 through the resistance of the potentiometer wiper, and into C111. As current flows into C111, its voltage begins to rise. When the voltage on C111 reaches the logic high threshold of RC3 (configured as a digital input), the timer is stopped and the time is recorded in memory. The ratio between the time to charge C111 through the full potentiometer and the time to charge C111 through the wiper of the potentiometer, gives a value that represents the percent rotation of the potentiometer. Capacitor C109 is not part of the timing circuit but rather it is used for decoupling noise from the input pin RC3. C108 and C112 are used for ESD protection. The circuitry described above associated with first potentiometer P101 can be duplicated for developing time delay information from the output of second potentiometer P102 and for developing time delay information from an extensive resistance varying device 42.

In the example of FIG. 2c, timer processor system 40-1M is provided by an inexpensive microcontroller having an integrated memory. Microcontroller 40-1M receives information from initiate circuit 32-1 and the potentiometer reading circuit 42-1 and uses this information to control the bridge SCR output circuit. The assembly language program that runs in microcontroller 40-1M will be described in more detail herein below.

Microcontroller 40-1M requires an operating voltage between 2.5 VDC and 7.5 VDC. Power supply 30-1 limits the voltage on the high end with Z101. However, if the line voltage that runs the power supply drops in magnitude or disappears momentarily, the power supply to the microcontroller may decay. A reset circuit monitors the power supply voltage. If it drops below about 3 VDC, the reset circuit applies a logic low to RB3 input of the micro. This input is known as the "master clear" input. A logic low at this input holds microcontroller 40-1M in a reset state. A logic high at this input allows the micro to function normally. The reset circuit consists of R107, R108, R109, C106, D1066, and Q103. Resistors R107 and R108 are connected in series between the power supply 30-1 and circuit ground creating a voltage divider, with the e-b junction of Q103 in parallel with R107. If the power supply voltage is high enough to make the voltage across R107 exceed the Vb-e of Q103, current will conduct through Q103's e-b junction, turning the PNP transistor on. This will allow current to flow through D106 and R109. The current flowing through R109 creates a voltage, which is also applied to RB3 of the microcontroller 40-1M. When the power supply drops low enough so that the voltage on R107 is less than that of Q103's e-b junction, it turns off, preventing current from flowing through R109. Without current to create a voltage, R109 pulls RB3 of microcontroller 40-1M to circuit ground, putting microcontroller 40-1M into reset.

Capacitor C105 is connected between the Vdd and ground pins of the micro. Capacitor C105 functions as a low pass filter to keep short duration noise transients from entering the power supply of the microcontroller. It also serves as bulk charge storage device and holds energy for microcontroller 40-1M when it has short duration periods of high demand on its supply current.

The connections to RB0 and RB1 serve two purposes. First, they may connect to, a non-volatile memory device. The two connection lines may serve a clock and data connections to allow microcontroller 40-1M to store and retrieve data from an EEPROM as indicated by EEPROM 40-3E shown in the module FIG. 2g. Second, they connect to pin header E1. Lines E1–3 and E1–4 of header E1 serve as clock and data connections for an In Circuit Serial Programming (ICSP) system to allow code to be written from program builder system 14 into the microcontroller 40-1M. This ICSP capability is the cornerstone of the previously described system of allowing hardware to be built, then programmed later per order.

Last, resonator X101 is connected to the microcontroller via pins RB4 and RB5. While the microcontroller has the ability to run on its own internal clocking circuit, this circuit can only provide timing accuracy to ±10%. The resonator provides a clock source for microcontroller 40-1M that has a timing accuracy of ±0.5%. This part is optional, based on the desired timing accuracy for the end product.

Figure 2D:
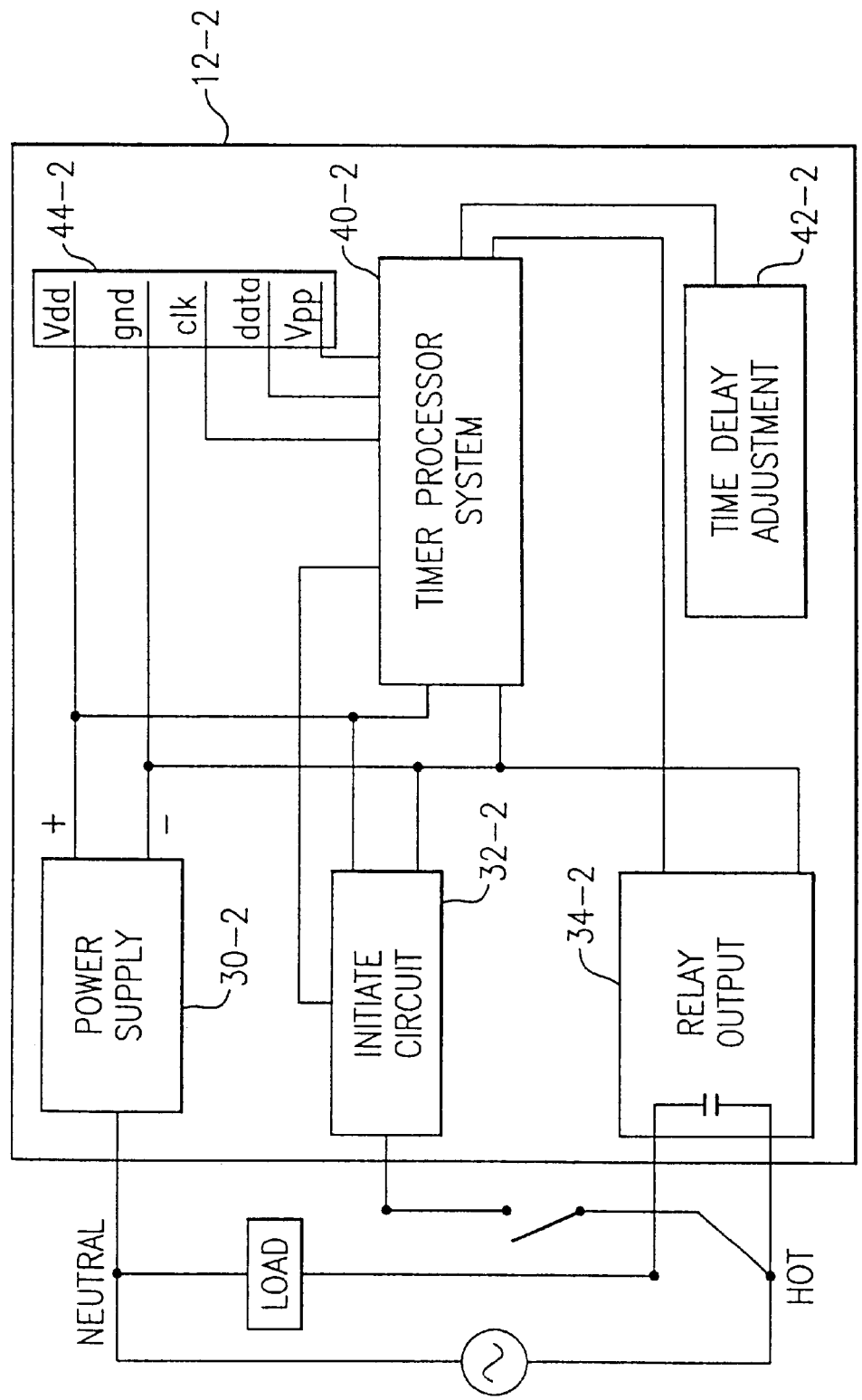
Figure 2E:
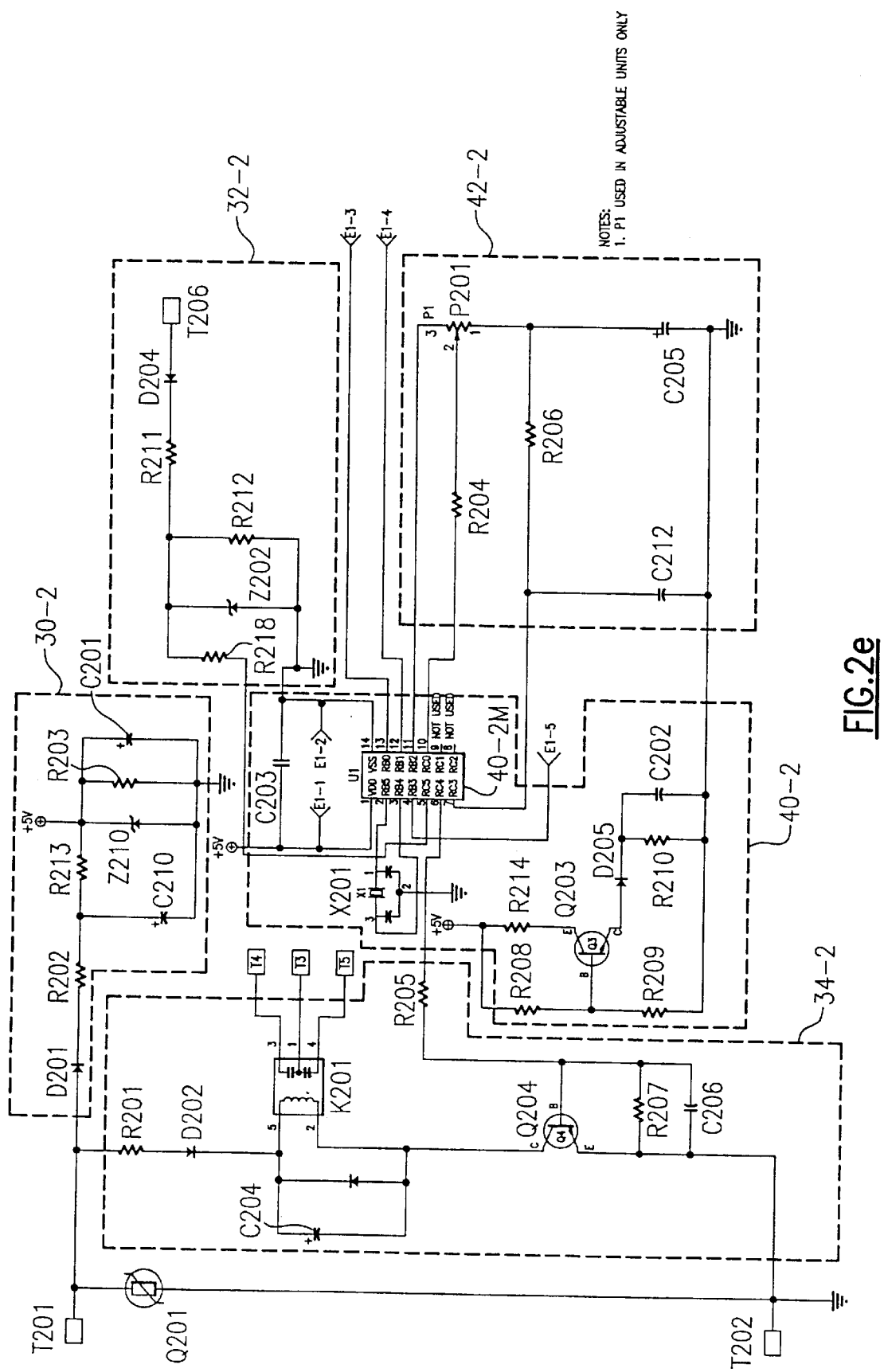

Referring now to the block diagram of FIG. 2d and the circuit diagram of FIG. 2e, timer module 12-2 includes a relay output circuit unit 32-2 and a solitary adjustable time delay.

Power supply circuit unit 30-2 of module 12-2 is designed to operate at 120 VAC and 230 VAC. This power supply circuit has to develop a 48 VDC supply to run the output relay coil, and a 5 VDC supply for microcontroller 40-2M and remaining logic circuitry. The 48 VDC supply is rather power hungry. It requires around ½ watt of power. This much power is difficult to achieve running on 230 VAC line power, without using magnetics or creating an excessive amount of waste heat. Once the 48 VDC supply is developed, it is easy to further drop the voltage down to 5 VDC for the power supply to microcontroller 40-2M.

Diode, D101, serves as a half wave rectifier. It converts the AC line voltage into a series of dc voltage pulses made up of the positive halves of the sinusoidal line voltage. Usually these DC voltage pulses would be reduced in magnitude using a power resistor, and filtered into pure dc voltage. In this case, the power dissipated in the resistor would be excessive. To the end that this excessive heat problem is avoided, capacitor, C204, holds the charge used to power the coil of the relay, K201. When C204 supplies current to the relay coil, its voltage drops. When the voltage on C204 drops below 5 LVDC, zener diode, Z203, blocks current from flowing into the gate of SCR, Q205. With no current into its gate, Q205 turns off as soon as the current flowing from its anode to cathode drops below the holding current. When Q205 turns off, it no longer shunts current away from the gate of Q204. When the input voltage rises with a positive transition of the sinusoidal input of the line voltage, current begins to pass through R220 and R227. It continues through Z204, whose reverse breakdown voltage is 15 VDC. Thus, Z204 causes 15 VDC to be applied across the gate-source of the FET, Q204. With 15 VDC on it gate, Q204 turns on and allows current to pass from its drain to source. Since resistor, R201, is small, the magnitude of current that passes through the drain-source of Q204 is rather large. This current continues on through diode, D202, and into capacitor C204. The current entering C204, causes its voltage to rise. Once the voltage on C204 rises enough to break down the reverse voltage of Z203, current flows into the gate of Q205, turning it on. With Q205 turned on, current is shunted away from R227 and Z204. This removes the voltage from gate-source of Q204, turning it off. Note that R227 and C213 slow down the removal of voltage from the gate-source of Q204. This slowdown keeps Q204 from turning off too quickly, thus reducing the amount of electrical noise generated. With Q204 turned off, current no longer flows between its drain and source. Current no longer flows into C204, and its voltage begins to fall as its charge is used to run the relay coil. When the voltage on C204 falls enough for Q205 to turn off, the cycle repeats.

Power supply 30-2 takes slugs of current as needed. When C204 is discharging, the power supply does not take any input current. This method does not require any large power resistors to continuously drop voltage. The resistors that do drop voltage are not used continuously and are used mostly when the input voltage is just beginning to rise. This allows the resistors to cool when not in use, and requires them to drop less voltage because they are used when the line voltage is at its lower magnitudes. The result is a line powered power supply that can run the ½ watt coil of K201 without producing excessive waste heat.

The 5 vdc logic power supply uses the 48 VDC supply as its input. A single resistor, R202, is used to drop the 48 VDC supply down to the 5 VDC level. A double pole low pass filter (C210, C201, and R219) is used to clean up the voltage into filtered DC. Zener diode, Z201, regulates the supply to 5 VDC.

Referring to initiate circuit 32-2 the initiate circuit 32-2 supplies a 5VDC square wave at line frequency to RC5 of microcontroller 40-2M whenever the initiate switch 45 is closed. When the switch is closed, terminal T206 is connected to the "hot" side of the line voltage powering the unit. Diode, D204, conducts when line voltage is in its positive half cycle and blocks when line voltage is in its negative half cycle. When D204 conducts, current passes through R214 and R229 and R215. R114, R229, and R215 form a voltage divider, dropping line voltage down to a value just slightly higher than 5 VDC. Zener diode, Z202, clips the output of the voltage divider down to 5 VDC so it can be applied to the input of microcontroller 40-2M. During the negative half cycle of the input line voltage, D204 blocks, and no current passes through initiate circuit 32-2. In this condition, R215 pulls the voltage on RC5 down to 0 VDC. The result is a 5 VDC square wave on RC5 when initiate switch 45 is closed.

When switch 45 is open, no current passes through initiate circuit 32-2. In this condition, R215 pulls the voltage on RC5 down to 0 VDC, resulting in a steady 0 VDC signal being applied to RC5. Because microcontroller 40-2M is programmed to recognize a 5 VDC line frequency square wave as the signal from a closed initiate switch, no filtering on this signal is required. Thus, C207 is not used.

Referring now to relay output circuit 34-2, relay, K201, requires 48 VDC to be applied to its coil before it can energize. To keep the relay de-energized, output RC4 of microcontroller 40-2M is held to 0 VDC. This prevents current from flowing into the base of Q202. With no base drive current, Q202 remains turned off. It does not allow current to flow from its collector to emitter. With no path through Q202 for relay coil current to get to circuit ground, no current flows. With no current flowing through the relay coil, its contacts remain in the de-energized state, when the microcontroller decides the relay should energize, it put a 5 VDC output at RC4. This voltage is applied to R205 and results in a current flowing into the b-e junction of Q202. The resistor values are selected such that the current that flows into Q202's base, is enough to fully turn it on. With Q202 in saturation, it acts like a switch, with the connection between collector and emitter closed. With this switch closed, there is a path for current to flow from the 48 VDC power supply, through the K201 coil, through Q202 to circuit ground. As a result the output of K202 is energized. Thus, the microcontroller 40-2M has control over the state of K201. D205 is called a free-wheeling diode. It's purpose is to dissipate the energy held by the inductance of the relay coil. When Q202 turns off, the inductance of the relay coil causes its current to continue to flow. D205 allows current to flow out of one side of the coil back into the other side, until the stored energy is dissipated.

Because time delay adjustment circuit 42-2 and timer processor system 40-2 operates essentially in the manner of time delay adjustment circuit 42-1 and timer processor system 40-1M, respectively, a description of these circuits is omitted.

Figure 2F:
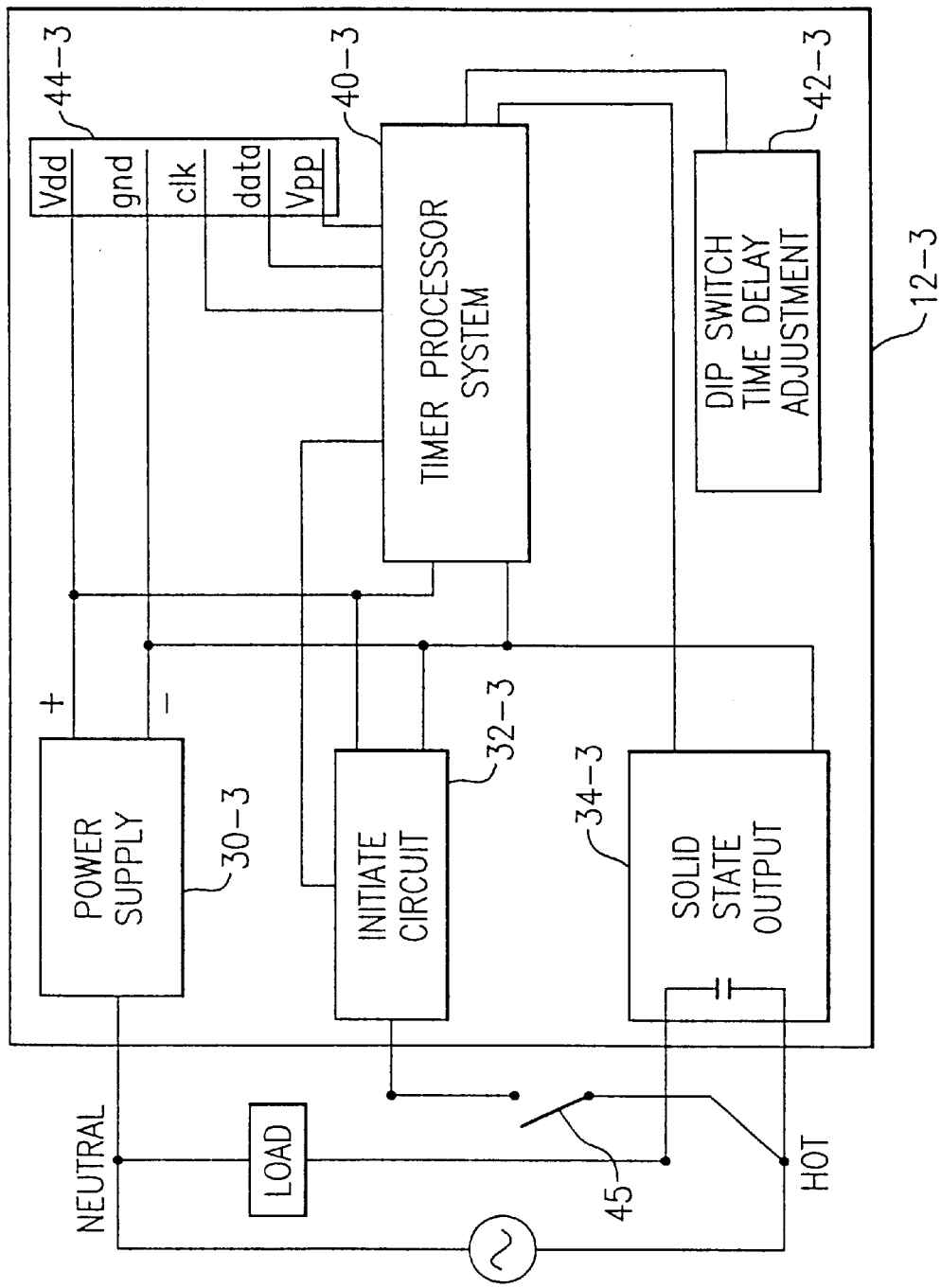
Figure 2G:
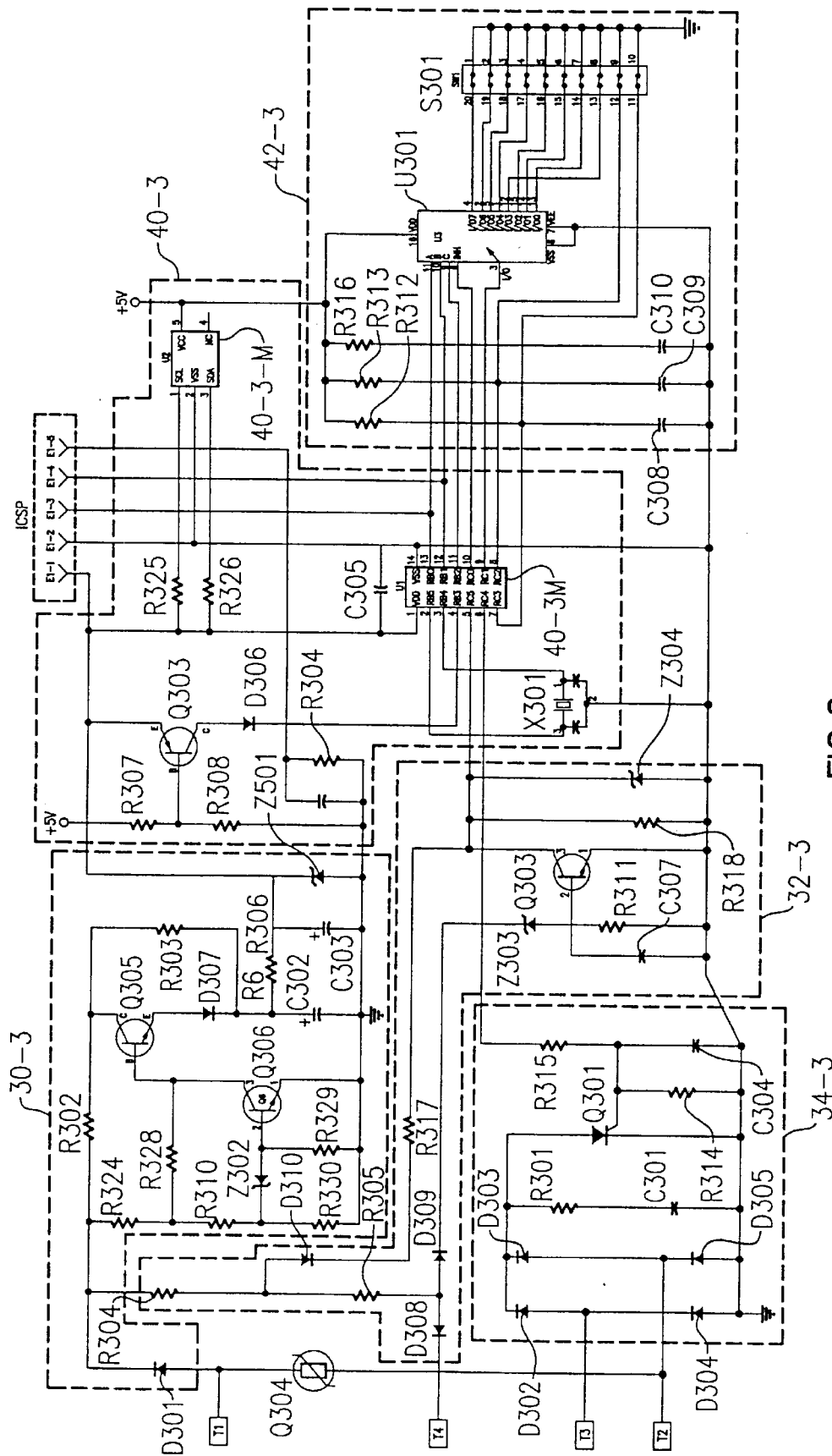

Referring now to the block diagram of FIG. 2*f* and the circuit diagram of FIG. 2*g*, timer module 12-3 includes a solid state output circuit 34-3 and a time delay adjustment circuit 42-3 including a dip switch.

Because power supply circuit 30-3, initiate circuit 32-3, and output circuit 34-3 operate essentially in the manner described relative to circuit 30-1, initiate circuit 32-1, and circuit 34-1, respectively, separate description of these circuits is omitted.

Time delay adjustment circuit 42-3 processes signals output by a 10 switch dip switch S301. Two switches are read directly by inputs of microcontroller 40-3M. Pull up resistors R312 and R313 are connected to input pins RC2 and RC3 of microcontroller 40-3M. Dip switch position 9 is connected between RC2 and circuit ground. When dip switch 9 is open, 5 VDC is applied to RC2 through R313. Since RC2 is a high impedance input, no current flows into it; thus no current flows through R313 and there is no voltage drop across R313. The full 5 VDC supply is applied to RC2 creating a logic high when dip switch 9 is open. When dip switch 9 is closed, it connects RC2 directly to circuit ground. This places a logic low signal at input RC2. Dip switch position 10 works in conjunction with R312 and RC3 to operate the same way as dip switch position 9.

The remaining dip switch positions are read through multiplexor, U301. U301 has 8 inputs, each of which can connect to its single output, one at a time. The selection of which input is connected to the output is accomplished using the A, B, and C input pins. The logic levels applied to each of the three pins combine to form a binary number representing which input is connected to the output. The output of U301 is connected to RC1 of microcontroller 40-3M and R316. RC1 is set as an input (high impedance). Since pull up resistor R316 is connected to the 5 VDC supply, a logic high is applied to RC1 as long as the signal from the resistor is not pulled to circuit ground by a dip switch.

Pins A, B, and C of multiplexor U301 are used to select each of the mux's inputs, one at a time. As each dip switch position is selected, if it is open, R316 pulls the signal on RC1 up to a logic high. If it is closed, it connects RC1 to circuit ground, creating a logic low condition. Between the operation of the dip switch and the direct readings of 2 dip switch positions, the state of the entire dip switch is entered into microcontroller 40-3M.

The incorporation of dip switch S301 in module 12-3 allows module 12-3 to be readily programmed to execute counting applications in addition to timer applications. When module 12-3 operates a counter, the status of output circuit 34-3 depends upon the number of times initiate switch 45 has made. In one counting application, processor system 40-3, is programmed with a count value so that when powered up, system 40-3 closes output 34-3 on the condition initiate switch 45 has been made a number of times equal to the count value. It is useful to program module 12-3 to operate as a counter in many vending machine related applications, for example. The circuit elements described with reference to FIG. 2*g* may be mounted on a printed circuit board using surface mount manufacturing methods to allow module 12-3 to be packaged in a 2×2 package. Referring now to aspects of program builder system 14, program builder system 14 provides two major functions. First, program builder system 14 develops a timer module operating program in response to an input into builder system 14 by a user. Second, program builder system 14 transmits a timer module operating program to timer module 12 via breakable communication link 20.

Program builder system 14 in the timer module system of FIG. 1*a* is shown as being implemented in personal computer. Program builder system could also be implemented, for example, in a hand-held, "palm" computer, notebook computer, or another device having a microprocessor incorporated therein, for example, custom designed piece of hardware. Program builder system 14 should have display 46, a user interface such as keyboard 48 or graphical user interface including port device 50 or voice interface for enabling receipt of user activated program building commands and program transmission commands from a user. While the program builder system is shown as being implemented in a solitary personal computer, it will be understood that the functions of program builder system 14 can be shared between a plurality of processing systems or divided between a plurality of processing systems. For example, as will be discussed further herein, a program developing function of system 14 can be executed by a program developing processor system maintained by a supplier, and a program transmission function of the program builder system 14 can be carried out by a program transmission processing system at the customer's place of business.

Model number data page 16 of system 10 is described in further detail with reference to FIGS. 3a and 3b. Model number data page 16 is made available to a user in order to facilitate the selection of model number for input into the program builder system 14 so that program builder system 14 can program timer module 12 in accordance with the timer functions, time delay functions, and time delay ranges and settings required of timer module 12.

A first example a model number data page is shown in FIG. 3a. Model number data page 16-1 includes a list of model numbers 56 correlated with a plurality of parameters 58 for each model number. In the example of FIG. 3a the parameters correlated with each model number include a supply voltage rating parameter from a supply voltage column 60, a timer function parameter from a timer function column 62, a time delay function parameter from a time delay function column 64, a fixed time delay parameter from a fixed time delay parameter column 66, and a timing range parameter from a timing range parameter column 68. Fixed time delay timers have fixed time delay parameters, while manual time delay timers have timing range parameter which delimit the range within which the time delay that can be manually adjusted.

A second example of a model number data page in which the identity of certain model number characters designate the value of certain timer module parameters is shown in FIG. 3b. In the example of FIG. 3b model numbers comprise 9 to 14 characters. The first five characters C1–C5 designate the type of timer. The particular model number data page of FIG. 3b is used for selecting model numbers of timer modules having a solid state output and a single fixed time delay. Referring to further model number characters in the example of FIG. 3b, the sixth character C6 of the possible model numbers indicated in the example of FIG. 3b designates the voltage rating of the module, the seventh character C7 designates the time delay function, the eighth character C8 designates the time delay range (if a manual time delay function is selected), while the ninth C9 and possibly the ninth and tenth characters C9–C10 designate the timer function as listed in the timer function list TFL. It is seen from the comment section CS that if a fixed time delay function is selected (character C7), that at least the eighth and ninth C8 and C9 and possibly the eighth to twelfth characters, C8 to C12, of the selected model numbers designate the value of the fixed time delay parameter.

In the example of FIGS. 3a and 3b, the model number data page 16 is shown as being printed on a sheet of paper. The model number can also be formed on several sheets of paper, and may be in booklet form. Model number data page 16 is conveniently provided as part of a product catalog routinely supplied to a customer by a supplier and updated as is appropriate. Further, a model number data page can be electronically formed and displayed on a display such as a display 46 of program builder system 14 or on a display of another computer device. In the case that a model number data page 16 is displayed on a computer display such as a display 46, standardly known point and click methods may be employed for use in selecting model numbers from a data image or characters of a model number where the model number data page is of the type shown in FIG. 3b. It is understood that an electronically generated model number data page 16 may be included in an internet website under the control of a supplier, so that a customer may access model number data page 16 by accessing a supplier's internet website.

It can be seen from the description of various timer modules accompanying FIGS. 2a–2g that particular timer functions, time delay functions, and time delay ranges can be realized by appropriate control of the outputs of timer processor systems or circuits 40-1, 40-2, and 40-3 of the various modules. Aspects of the requirements of a timer operating program for loading into timer module 12 will now be described, are described with reference to FIG. 4.

In the case timer module 12 includes initiate circuit 32, the operating program of timer module 12 should cause timer processor system (which may be termed timer control circuit 40) to read the status of the initiate switch. Timer processor system 40 should also read up to two adjustable time delay settings, and control an output device 34. Furthermore, the program should also have the capability to configure module 12 to execute a plurality of different timer functions, (delay on make, delay on break, single shot, etc.). The program should also configure system 40 to accept a parameter indicating the fixed or adjustable status time delay functions of module 12. If a product is to have a fixed time delay, the program must configure system 40 to accept information regarding the duration of the fixed time delay. If module 12 is to have an adjustable time delay, system 40 should be configured to accept a timing range parameter. Still further, this information should be able to be changed in an already programmed part, in case the function of a programmed unit is no longer useful to the customer.

The inventors developed particular program architecture in order to satisfy the above objectives. The classic method for implementing a program that is capable of performing multiple functions is to write individual blocks of code for each function. The overall program would then only require some indication as to which block of code to use to implement a certain timing function (delay on make, delay on break, single shot, etc.). There are two drawbacks to this method. The first is that many timing functions are similar to each other, which would result in unnecessary duplication of code across function blocks and therefore inefficient use of memory space. The second drawback is the fact that whenever a customer requires timer function, a new block of code would be required.

In developing a highly efficient program architecture for a timer operating program the inventors found that each of several standard timer functions (delay on make, delay on break, single shot, etc.) can be considered to be defined by a series of timer events. Examples of common timer events are events such as, "turn on the output," "turn off the output," "wait for the initiate switch to close," "wait for the time delay to expire." Instead of having a different complete set of code instructions for carrying out each timer function, the operating program of the present invention has a different set of code instructions for each of several timer events. These event-based code instructions may be termed sub-function code instructions. In order to define a timer function using the operating program of the invention, the user designates an ordering of sub-functions that defines the required timer function. The program architecture of the invention conserves memory space and allows the program to readily be adapted to perform new timer functions as they are developed.

In developing program builder programs for execution by program builder system 14, the inventors developed a series of timer event sub-functions, and defined a series of timer functions by stringing together a particular ordering of sub-functions for each timer function. It can be seen therefore that program builder system 14 should comprise a lookup table that correlates sub-function lists with like timer model numbers or at least function designation model number characters so that an appropriate list of sub-functions is assembled by system 14 by entering a timer model number into program builder system 14. The following is a sample list of timer event sub-functions.

1. Turn load ON;
2. Turn load OFF;
3. Maintain current output state forever;
4. Maintain current output state until ON to OFF transition of the initiate switch occurs;
5. Maintain current output state until OFF to ON transition of the initiate switch occurs;
6. Maintain current output state until TD1 expires;
7. Maintain current output state until TD1 expires, reset TD1 on ON to OFF transition of the initiate switch;
8. Maintain current output state until TD1 expires, reset TD1 on OFF to ON transition of the initiate switch;
9. Start Over;
10. Accumulate TD1 while the initiate switch is closed until TD1 expires, hold TD1 reset while the initiate switch is open;
11. Accumulate TD1 while the initiate switch is closed until TD1 expires, do not reset TD1 when the initiate switch opens;
12. Accumulate TD1 while the initiate switch is open until TD1 expires, hold TD1 reset while the initiate switch is closed;
13. Recycle with equal on and off times using TD1 (ON time first);
14. Recycle with equal on and off times using TD2 (ON time first);
15. Maintain current output state until TD2 expires;
16. Maintain current output state until TD2 expires; reset TD2 on ON to OFF transition of the initiate switch;
17. Maintain current output state until TD2 expires, reset TD2 on OFF to ON transition of the initiate switch;
18. Accumulate TD2 while the initiate switch is open until TD2 expires, hold TD2 reset while the initiate switch is closed;
19. Maintain current output state until TD1 reaches a predetermined count of initiate switch closures;
20. Maintain current output state until TD2 reaches a predetermined count of initiate switch closures;
21. A special Delay on Make function for very short DOM time delays.

The following is an example of using a list of sub-functions to create a single shot timing function. The single shot timing function is a standard type of timing function commonly available from timer manufacturers. When programmed to execute a single shot function, system 40 waits for a unit's initiate switch to transition from the open to closed state. Once this transition takes place, processor system 40 turns on the unit's output for a time delay (adjustable or fixed). Once the time delay expires, the unit's output turns off. The unit then waits for another open to close transition of the initiate switch. A single shot timer function can be realized by combining the following sub-functions: 2, 5, 1, 6, and 9. These sub-functions are described more fully herein below.

2. Turn load off—This sub-function is run first to ensure that the load is off when the unit first powers up.

5. Maintain current output state until OFF-->ON transition of the initiate switch occurs. —This sub-function waits for the initiate switch and keeps the load in the "off" state, as was specified by the previous sub-function.

1. Turn load on —after the previous sub-function detects an initiate event, this sub function specifies that the load should turn on.

6. Maintain current output state until TD1 expires. —This sub-function keeps the output on until the time delay expires.

9. Start Over —This sub function sends the KXPX program back to the beginning of the sub-function list, where a turn load off command is found.

This short list of sub-functions implements the single shot timing function. The creation of the remaining timing functions is accomplished in similar manner. The list of sub-functions can be termed timer function setup codes. The following is a list of setup codes for timer functions.

| Delay on Make: | 2, 6, 1, 3 |
| --- | --- |
| Delay on Break: | 2, 5, 1, 12, 9 |
| Single Shot: | 2, 5, 1, 6, 9 |
| Recycle: | 1, 13, 3 |
| Interval: | 1, 6, 2, 3 |
| Trailing Edge Single Shot: | 2, 4, 1, 6, 9 |
| Inverted Single Shot: | 1, 5, 2, 6, 9 |
| Inverted Delay on Break: | 1, 5, 2, 12, 9 |
| Accumulative Delay on Make: | 2, 11, 1, 3 |
| Retriggerable Single Shot: | 2, 5, 1, 8, 9 |
| Delay on Make/Delay on Break: | 2, 10, 1, 18, 2, 9 |
| Delay on Make, Recycle: | 2, 6, 14, 3 |
| Delay on Make, Interval: | 2, 6, 1, 15, 2, 3 |
| Delay on Make, Single Shot: | 2, 5, 6, 1, 15, 9 |
| Interval Recycle: | 1, 14, 6, 2, 13 |
| Delay on Break, Recycle: | 2, 5, 14, 12, 9 |
| Single Shot, Recycle: | 2, 5, 14, 6, 9 |
| Recycle (both times adj): | 1, 6, 2, 15, 9 |
| Interval, Delay on Make: | 1, 6, 2, 15, 1, 3 |
| Accumulative Delay on Make, Interval: | 2, 11, 1, 15, 2, 3 |

The program architecture of the invention simplifies the task of developing instructions for executing different timer functions. Note, for example, that the "delay on break" and "single shot" timer functions, defined above, differ only with respect to the fourth sub-function. The fourth sub-function (12) defining the "delay on break" function causes the time delay timer to be reset; whereas the fourth sub-function (6) defining the single shot function does not cause the time delay timer to be reset. It is seen that if standard function programming methods were adopted, the code sections for executing sub-functions 2, 5, 1, and 9 would have to be duplicated, therefore increasing the memory space requirements of the processor system. The program architecture of the present invention reduces the memory space requirements of processor system 40 and therefore the cost of timer module 40.

Figure 4:
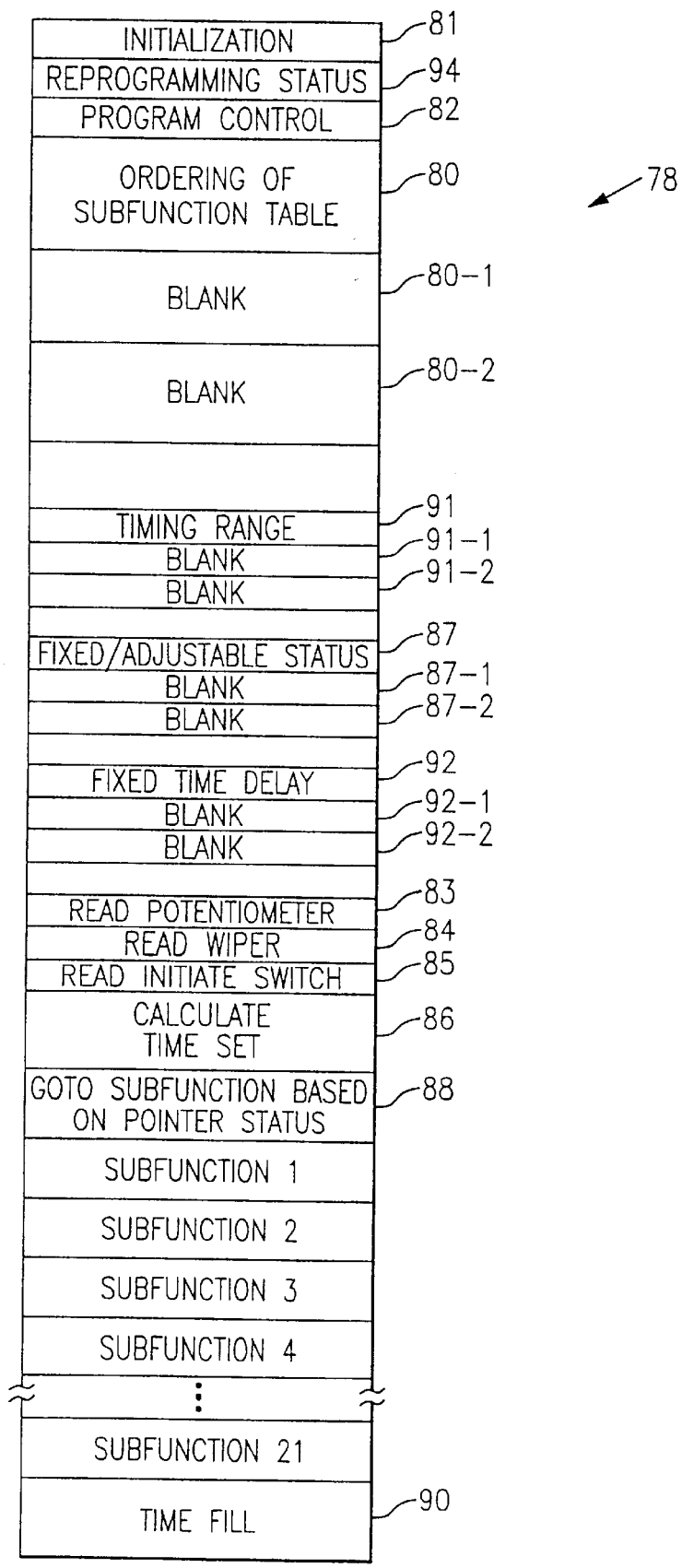
FIG. 4a is a program map illustrating an exemplary architecture for a timer operating program according to the invention.

A specific example of an architecture for an assembly language program for implementation in a low cost one-time programmable timer processor system 40 having limited ROM and limited RAM memory space is described with reference to program map 78 shown in FIG. 4.

A table comprising the list of sub-functions in a specific order for performance of a specific timer function is stored in code section 80. An initialization code section 81, while establishing initial RAM variable values, includes instructions causing processor system 40 to look up the variable corresponding to the first sub-function of the table stored in code section 80. In executing instructions of code section 81 processor system 40 stores an initial sub-function "pointer" variable, P, into a designated location of an on board RAM memory section of system 40.

Program control section 82 includes instructions for maintaining a record of the number of passes through the program which have been made. Based on this record, processor system 40 determines which of the "read potentiometer," "read wiper," and "read initiate switch" subroutines to execute during the current pass. Instructions for executing these subroutines are stored in code sections 83, 84, and 85. As alluded to previously, the combined "read wiper" and "read potentiometer" steps are not required if an A/D converter is incorporated in association with potentiometer 42. Further, the "read potentiometer," "read wiper," and the "time set calculation" subroutine comprising instructions 83, 84, and 86 for determining the time delay based on the potentiometer and wiper outputs are avoided altogether if the timer module is programmed to have a fixed timed delay. Preliminary instructions of the "read potentiometer," "read wiper," and "calculate time" set subroutines cause processor system 40 to determine the fixed/adjustable status of processor system 40 by interrogation of a RAM variable whose value is based on programmed fixed/adjustable status designated in code section 87.

Code section 88 comprises an instruction causing processor system 40 to execute one specific sub-function during a pass through the program. Specifically, code section 88 comprises a GOTO instruction causing the processor system 40 to execute a specific sub-function based on the status of a sub-function pointer. When timer module 12 is first powered up, the sub-function pointer variable, as described previously, is the first sub-function from the list of sub-functions stored in code section 80.

Accordingly, if module 12 is programmed to have a "single shot" function, processor 40 system executes sub-function 2 (turn load off) during the first pass through program. This sub-function requires only one pass through the program for execution. However, it is seen that other sub-functions may be executed repeatedly hundreds of thousands or more times until the "event" associated with the sub-function is completed. For example, processor system 40 will not stop execution of sub-function 5 "maintain current output state until OFF to ON transition of the initiate switch occurs" though consecutive passes of program 78 until processor system 40 determines that the initiate contact is closed.

When a sub-function is complete, processor system 40 executes an instruction of the completed sub-function code section which results in processor system 40 polling the contents of sub-function table represented by code section 80 in order to update the value of pointer variable, P, indicates the next sub-function to be executed. When processor system 40 is provided by a Microchip, Inc., PIC16C505 type processor system, the setup codes of code section 80 may be stored using (RETLW) return literal commands. It is understood that when utilizing such a low-cost microprocessor such as a Microchip PIC16C505 in module 12, commands originally authored in assembly code will be normally assembled by program builder system 14 into machine code prior to being loaded into module 12. When a line of code comprising a RETLW command is called, a number is returned to the call location. After executing one sub-function during a current pass through program 78, processor system executes a "time fill" step comprising code section 90. The instructions of time fill code section 90 cause processor 40 to wait a certain amount of time so that a total amount of time consumed by the current pass through the program represented by map 78 is a predetermined time. With the particular Microchip, Inc. processor system used, this predetermined amount of time is 20 ms. Accordingly, by providing time fill code section 90, a count variable, C, counting the number of passes through the program constitutes a clock.

Code sections 81, 82, 83, 84, 85, 86, 88, and 90 can be maintained the same for timer operating programs for each of several timer model numbers. The code sections that change depending on the timer module model number are the sub-function list code section 80, the fixed/adjustable status indicating code section 87, described herein above, the timing range indicating code section 91 and the fixed time delay indicating code section 92.

Thus, it is seen that timer module 12 can be configured to operate in accordance with timer function, time delay function, and time setting parameters of a different timer model number simply by changing code sections 80, 91, 87, and 92. In the case that the program memory of system 40 can be rewritten, new code can be written to the memory locations of code sections 80, 91, 87, and 92 from program builder system 14 in order to program module 12 in accordance with a new model number.

For enabling reprogramming of timer module 12 in the case that processor system 40 includes a one-time programmable program memory, blank memory locations 80-1, 80-2, 91-1, 91-2, 87-1, 87-2, 92-1, and 92-2 can be provided in association with each of the operating parameter code sections. In order to reprogram module 12, program builder system 40 writes new code to certain lines of the blank memory locations. For a first reprogramming of module, program builder system 14 may write new code to blank memory location 80-1, 91-1, 87-1, and 92-2.

When reprogramming a timer module 12, program builder 14 also changes certain codes of reprogramming status code section 94. Reprogramming status code section 94 of program map 78 comprises code which determines which of the sets of operating parameters (the first set, the second set or the third set) system 40 calls when executing program of map 78. To the end that timer module 12 is made reprogrammable using a one-time programmable memory, code section 94 can be made to comprise a routine that when called returns a number, either 0, 1, or 2. This number represents the number of times a micro has been reprogrammed. When module 12 is first programmed, this number is 0. When module 12 has to be reprogrammed, the line that returns the 0 has to be removed. Even though the program memory space is not re-programmable, it can be written over. Specifically, any memory bit containing a logic "1" can be changed to a logic "0". Once a memory bit becomes a logic "0", it cannot be changed back to a logic "1". However, the operation code for a NOP, or no operation, is made up of all 0's. Accordingly, any operation code can be changed to a NOP by writing all 0's over the address location. Thus, the program line containing the number of times a part has been reprogrammed can be changed to a NOP. The execution of the above routine would execute the NOP and continue on to the next line, which would return a "1" for the number of times the part has been reprogrammed.

In a specific example of the invention using a Microchip PIC series microcontroller, presented herein for further clarification, a subroutine of a program may comprise the following:

| SBRTN | RETLW.0 |
|---|---|
| | RETLW.1 |
| | RETLW.2 |

When system 14 or module 13 must determine how many times module 12 has been reprogrammed, it may call the sub-routine SBRTN. When that sub routine is called, code listed above is run. RETLW stands for return literal as is described in literature associated with Microchip PIC series microcontrollers. When the routine is called, as it is shown above, it returns a 0 representing 0 times reprogrammed.

When the device is reprogrammed for the first time, system 14 and module 12 are adapted so that RETLW 0.0 gets replaced with a NOP (no operation). In general, a blank memory of a one-time programmable processor comprises all 1's. When the processor is programmed, some of the 1's get changed into 0's thus making some significant mixture of 1's and 0's representing a program. Once a 1 is changed into a 0, it cannot change back into a 1. But, the remaining 1's can always be changed into 0's. Replacing a RETLW with a NOP in accordance with the protocol of the specific Microchip processor described uses this principle. This is possible because the actual code that gets saved in the processor's memory for NOP is 000. The resulting code takes the form:

| SBRTN | NOP |
|---|---|
| | RETLW.1 |
| | RETLW.2 |

When the subroutine is called again, the first line encountered is a NOP, which does nothing. The next line is RETLW. 1, which returns as 1 as the number of times the device has been reprogrammed.

It can be seen that the above programming method, which may be implemented on a one-time programmable microcontroller, may be used to determine which blocks of code of program 78 are to be executed, e.g. segments 80, 87, 91, and 92 if SBRTN returns a "0," 80-1, 87-1, 91-1, and 92-1 if SBRTN returns a "1," or 80-2, 87-2, 91-2, and 92-2 if SBRTN returns a "2."

Certain additional requirements of the program developing program for operating program builder system 14 can be understood with reference to requirements of the operating program of timer module 12, described above. As indicated, the program of program builder 14 should include a lookup table system which correlates timer model numbers with a list of sub-functions to be executed for each model number so that builder system 14 can transmit the appropriate setup codes to timer module 12. This lookup table system may comprise a single lookup table or series of lookup tables. For example, a first lookup table of the program developing program of system 14 can correlate model numbers with timer functions, and a second lookup table can correlate timer function codes such as code character C9+ of FIG. 3b with subfunction lists for each of the function codes.

In addition, program builder system 14 should have stored therein lookup table systems which correlate timer model numbers with time delay function (fixed/adjustable) parameters, timing range parameter, fixed time delay parameters, and possibly voltage rating parameters. In response to a timer model number input, program builder 14 calls the appropriate operating parameters corresponding to that model number for transmission into timer module 12. Of course, builder system 14 does not have to include model number-to-operating parameter lookup table systems for operating parameters that are designated by the characters of the model number, such as the parameters designated by the character C7 and C8 in the example of FIG. 3b. In the case that program builder system 14 is configured to receive model number inputs wherein operating parameters are designated by the characters of the model number, program builder system 14 should be configured to decode and parse out the operating parameters from the model number so that parameters can be appropriately input into timer module 12.

Figure 5A:
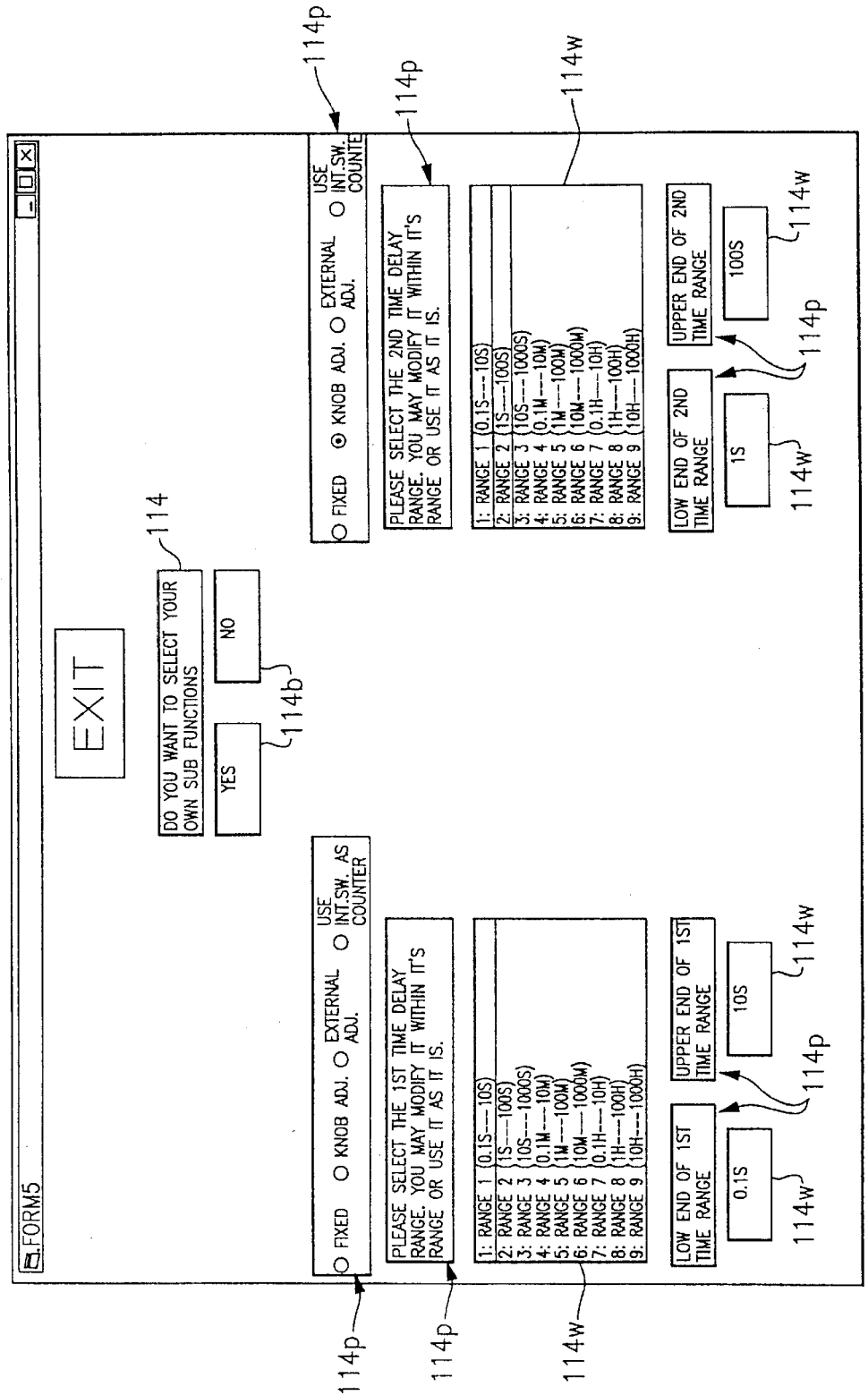
FIGS. 5a and 5b show programmer-interactive display screens which may be displayed by a program builder system according to the invention.
Figure 5B:

Additional features which may be incorporated into a program builder program of system 14 are described with reference to FIGS. 5a and 5b. As indicated, in one embodiment, system 14 may be adapted to receive a model number input comprised of a string of characters, wherein characters or groups of characters indicate the selection of a function or operating parameter, and may be adapted to parse the operating parameter or function-indicating characters from the model number string in order to build the desired operating program. In addition or in the alternative, as indicated in FIG. 5a, program builder system 14 may be adapted to display on display 46 information prompts 114p which prompt a user to input operating parameter information, typically using input windows 114w, which may be operated using standardly known point and click highlighting input selection methods. Thus, it can be seen in one embodiment, a user-programmer may parse operating parameter and function selection characters from a selected model number string by observation, and may enter the parsed characters or inputs corresponding to the parsed characters using a plurality of different input windows.

Referring to other features which may be incorporated in system 14, system 14 may be adapted to display a prompt 114c an input button or window 114b which enable a programmer-user to escape an automated program builder mode into a customizable program builder mode. FIG. 5b shows a display screen displayed by system after YES input 114b is actuated to enter a customizable program mode. In a customizable program mode, as is indicated in FIG. 5b, a programmer-user is able to build customized timer function by stringing together strings of timer subfunctions, selected by highlighting and selecting text messages corresponding to the desired string of timer subfunctions.

In addition to being configured to transmit a developed complete operating program to timer module 12, program builder system 14 is preferably adapted to write data to and read data from specific memory locations of timer processor system 40. For example, program builder system 14 may be adapted to read the contents of code section 94 in order to the determine the number of times timer module 12 has been reprogrammed. Further, program builder system 14 may read the contents of one or more of the code sections 80, 91, 87, and 92 and display such contents (or information derived from such contents) on display e.g. 46, 46s, and 46c so that a user is informed as to the timer function, time delay function, timing range, and time delay setting of the module 12 as presently configured. When reprogramming timer module 12, builder system 14 may first read the contents of code section 94 to determine the number of times timer module 12 has been reprogrammed to determine the appropriate blank memory address locations timer processor system 40 in which to transmit a new set of operating parameters. The software architecture described herein having subfunction code segments is most beneficial when the invention is implemented using a timer module having a small bit (e.g. 16 bit or smaller) one-time programmable microcontroller. For example, the microchip PIC16C5X series microcontroller described herein is an 8 bit one-time programmable microcontroller.

As will be understood to users of small-bit one-time programmable microcontrollers of the class of the microchip PIC series microcontroller, program builder program 14 when used to program a small-bit one-time programmable microcontroller, will normally include an IN-circuit device programmer 14p, for use in programming software into a microcontroller of module 12. The PRO MATE II in-circuit device programmer, available from Microchip, Inc. is a full-featured device programmer facilitating fast and easy serial programming of small-bit programmable devices. Device programmer 14p may be used as a stand-alone device or may be used in conjunction with a PC-compatible host system, e.g. PC 14 PC, FIG. 1a. When connected to a host system, programmer 14p provides an exceptionally user-friendly interface to give the developer complete control over a programming session.

In addition, as will be understood to users of microcontrollers of the class of Microchip PIC series microcontrollers, program builder program 14 can include a circuit emulator 14e, as seen in FIG. 1h. In use, emulator 14e is typically interposed between program builder system PC 14PC and module 12 prior to the programming of module 12. Program emulator 14e provides emulation of the functioning a programmed microcontroller prior to the actual down loading of a built program into a microcontroller using emulator 14e. The functioning of module 12 under the control of a particular program can be observed during the development of a program prior to the downloading of the program into module. Accordingly, using emulator 14e, programming errors can be corrected for prior to a program being downloaded into module 12. Examples of commercially available emulators are Microchip's PICMASTER series emulators and TEC-I, Inc.'s TECICE series emulators.

In a further aspect of the invention, system 10 may include a dedicated parameter reading module 13 for reading and displaying timer module operating parameters. Reader module 13 may include compact rugged portable housing 13h and a display 13d. Housing 13h may comprise the form factor of a portable data assistant (PDA), or may comprise a commercially available PDA which is adapted for use in association with module 12. Reader module 13 may communicate with timer module 12 via a breakable communication link 13L (e.g. a cable, a docking pin and socket arrangement, and a wireless link). Module 13 may include a sensing circuit for sensing operation parameters for display on display 13d. For example, module 13 may be adapted to read subfunction ordering table 80, to determine reader operating parameters from the information of table 80. Module 13 may also read operating parameter code segments such as segments 91, 87, 92 and then display operating parameter data determined from any of segments 87, 91, and 92 on display 13d. A sensing circuit of module 13 may also be in communication with output circuit 34. For example, module 13 may be in communication with an output pin of processor 40-M indicative of or tied to a pin controlling the state of output circuit 42. The sensing circuit may determine a time delay based on the output pin signal and may display the time delay information on integrated display 13d.

Referring now to specific methods for implementing the invention, an entire timer module system 10 can be located at a single location as is indicated in FIG. 1a, such as a supplier's place of business or a customer's place of business. The elements of system 10 can also be spread-out over several locations. For example, in case the program builder system 14 is located at a supplier's place of business 70 as is indicated in the plan diagram FIG. 2b, then a model number data page 16 may be provided to a customer at the customer's place of business 72 for use in selecting an appropriate model number for a certain application. When the customer selects the model number using the model number data page 16, the customer communicates the model number selection to a supplier via e.g. telephone, email, and facsimile who appropriately programs timer module 12 in accordance with the selected model number. The supplier then ships the programmed timer module 12 to the customer.

Figure 1C:
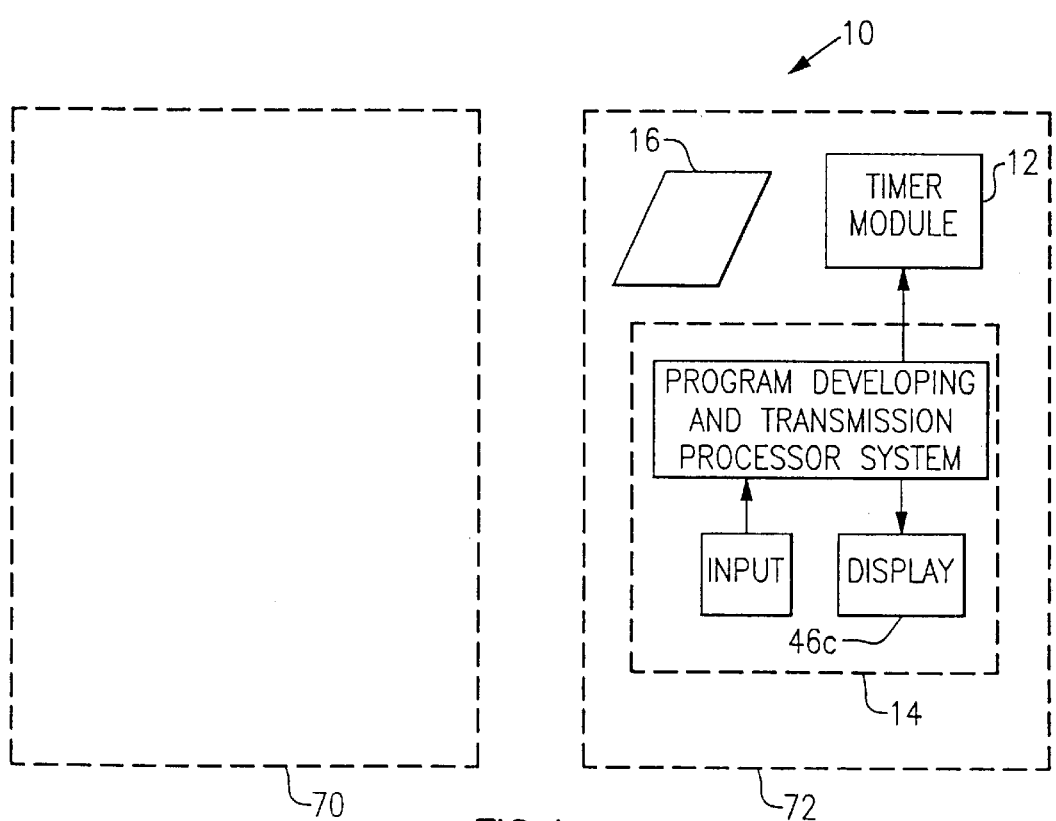

In the case program builder system 14 is located at a customer's place of business, all of the elements of timer module system 10 can be located at the customer's place of business 10 as is indicated in FIG. 1C.

Figure 1D:
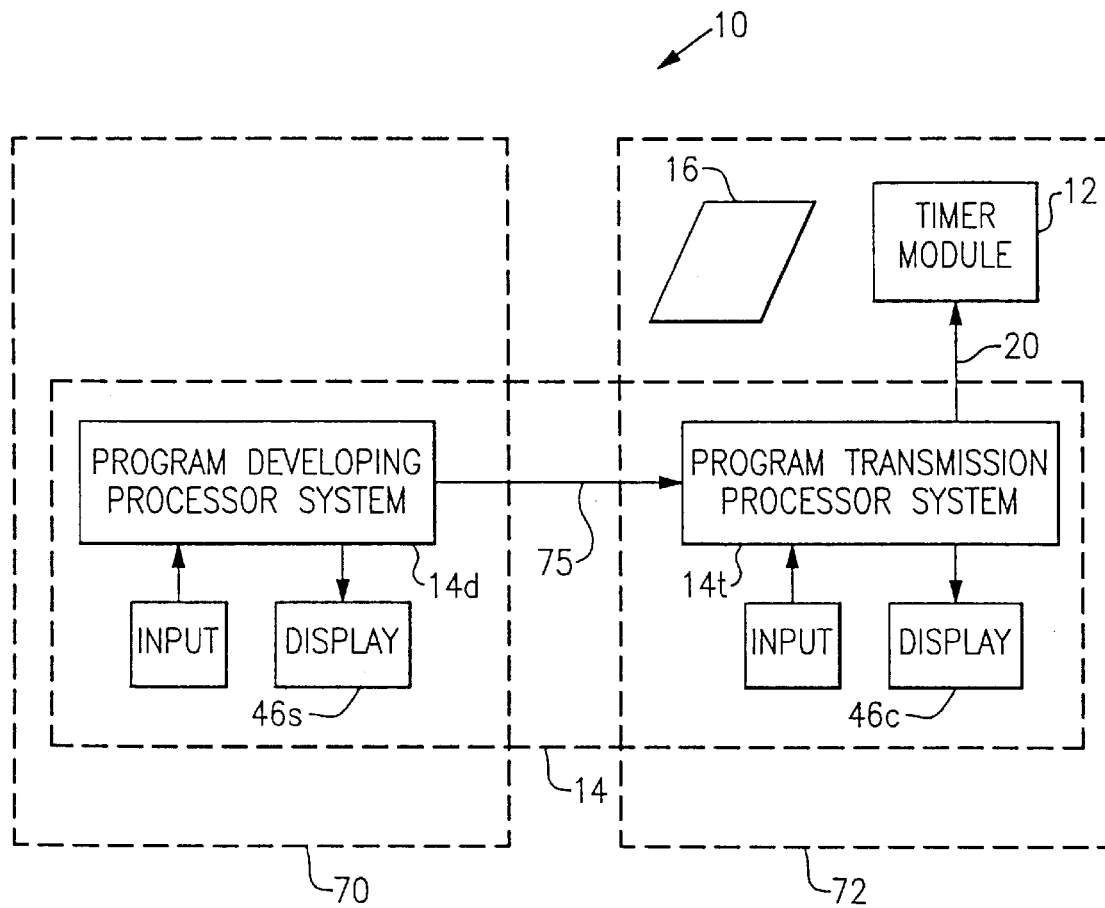

Timer module system 10 can be implemented so that program builder system 14 is located partially at a supplier's place of business 70 and partially at a customer's business 72. For example, as indicated by the plan block diagram of FIG. 1d, a program developing processor system 14t can be located at a supplier's place of business 70 and program transmission processor system 14t can be located at customer's place of business, together with an unprogrammed timer module 12. In the embodiment of FIG. 1d, a customer selects a timer model number using a model number data page 16, and communicates the selection to a supplier at location 70 who builds an appropriate timer program using program developing processor system 14d. The supplier from location 70 then delivers the program via a communication link 75 such as an internet link, or by shipping a storage device storing the built program to the customer at location 72, who transmits the program to the timer module 12 using transmission processor system 14t which may comprise programmer 14p.

In addition, if processor system 14d and timer module 12 are appropriately configured, a timer operating program can be loaded into timer module 12 directly from processor system 14d.

While the present invention has been explained with reference to the structure disclosed herein, it is not confined to the details set forth and this invention is intended to cover any modifications and changes as may come within the scope of the following claims:

What is claimed is:

1. A method for making a timer module that performs a desired timer function, said method comprising the steps of:
   providing a programmable timer module having a power supply circuit, an output circuit, and a programmable control circuit adapted to control at least one function of at least one of said power supply circuit, and said output circuit;
   establishing a program builder system for building a timer operating program for transmission to said timer module, said program builder system adapted to build a timer operating program including a plurality of timer subfunction code segments each corresponding to a different subfunction, wherein said program builder system includes a lookup table correlating each of a plurality of timer functions with a specific set of said subfunctions, wherein said program builder system is adapted to receive a timer function request input, and wherein said program builder system is adapted to build a subfunction ordering table based on said function request input and based on timer subfunctions correlated with said function request in said lookup table;

making available a model number data page correlating a plurality timer model numbers with information respecting said timer model numbers;

presenting a function request to said program builder system so that said program builder system develops for incorporation into said timer operating program a subfunction ordering table in accordance with said function request input, wherein said presenting step includes the step of selecting a timer model number based on said information of said model number data page; and loading said timer-operating program into said timer module.

2. The method of claim 1, wherein said program builder system is at a customer's place of business, and wherein said loading step is executed by a customer.

3. The method of claim 1, wherein said program builder system is at a supplier's place of business, and wherein said loading step is executed by a supplier.

4. The method of claim 1 wherein said model number data page is made available to a customer at a customer's place of business.

5. The method of claim 1, wherein said model number data page is made available to a customer at a customer's place of business, and wherein said model number data page is electronically displayed.

6. The method of claim 1, wherein said model number data page is made available to a customer at a customer's place of business, and provided on at least one paper substrate.

7. The method of claim 1, wherein each of said plurality of timer functions of said lookup table is selected from the group consisting of a delay on make timer function, a delay on break timer function, a single shot timer function, a recycle timer function, and an interval timer function.

8. The method of claim 1, wherein said establishing step includes the step of establishing said builder system so that said builder system makes said timer operating program with blank code segments adapted to accommodate at least one new subfunction ordering table, whereby said module can be reprogrammed in accordance with a new desired timer function without recruiting of a plurality of said subfunction code segments.

9. A method for making a timer module that performs a desired timer function, said method comprising the steps of:

providing a programmable timer module having a power supply circuit, an output circuit, and a programmable control circuit adapted to control at least one function of at least one of said power supply circuit, and said output circuit;

establishing a program builder system for building a timer operating program for transmission to said timer module, said program builder system adapted to build a timer operating program including a plurality of timer subfunction code segments each corresponding to a different subfunction, wherein said program builder system includes a lookup table correlating each of a plurality of timer functions with a specific set of said subfunctions, wherein said program builder system is adapted to receive a timer function request input, wherein said program builder system is adapted to build a subfunction ordering table based on said function request input and based on timer subfunctions correlated with said function request in said lookup table, and wherein each of said plurality of timer functions of said lookup table is selected from the group consisting of a delay on make timer function, a delay on break timer function, a single shot timer function, a recycle timer function, and an interval timer function;

presenting a function request to said program builder system so that said program builder system develops for incorporation into said timer operating program a subfunction ordering table in accordance with said function request input; and loading said timer-operating program into said timer module.

10. The method of claim 9, wherein said program builder system is at a customer's place of business, and wherein said loading step is executed by a customer.

11. The method of claim 9, said program builder system is at a supplier's place of business, and wherein said loading step is executed by a supplier.

12. The method of claim 9, wherein said model number data page is made available to a customer at a customer's place of business.

13. The method of claim 9, wherein said model number data page is made available to a customer at a customer's place of business, and wherein said model number data page is electronically displayed.

14. The method of claim 9, wherein said model number data page is made available to a customer at a customer's place of business, and provided on at least one paper substrate.

15. The method of claim 9, further comprising the step of making available a model number data page correlating a plurality timer model numbers with information respecting said timer model numbers.

16. The method of claim 9, wherein said establishing step includes the step of establishing said builder system so that said builder system makes said timer operating program with blank code segments adapted to accommodate at least one new subfunction ordering table, whereby said module can be reprogrammed in accordance with a new desired timer function without rewriting of a plurality of said subfunction code segments.

17. The method of claim 9, wherein at least one function of said plurality of timer functions of said lookup table is a delay on make timer function.

18. The method of claim 9, wherein at least one function of said plurality of timer functions of said lookup table is a delay on break timer function.

19. The method of claim 9, wherein at least one function of said plurality of timer functions of said lookup table is a single shot timer function.

20. The method of claim 9, wherein at least one function of said plurality of timer functions of said lookup table is a recycle timer function.

21. The method of claim 9, wherein at least one function of said plurality of timer functions of said lookup table is an interval timer function.

22. A method for making a timer module that performs a desired timer function, said method comprising the steps of:

providing a programmable timer module having a power supply circuit, an output circuit, and a programmable control circuit adapted to control at least one function of at least one of said power supply circuit, and said output circuit;

establishing a program builder system for building a timer operating program for transmission to said timer module, said program builder system adapted to build a timer operating program including a plurality of timer subfunction code segments each corresponding to a different subfunction, wherein said program builder system includes a lookup table correlating each of a plurality of timer functions with a specific set of said subfunctions, wherein said program builder system is adapted to receive a timer function request input, and wherein said program builder system is adapted to build a subfunction ordering table based on said function request input and based on timer subfunctions correlated with said function request in said lookup table, and wherein said establishing step includes the step of establishing said builder system so that said builder system makes said timer operating program with blank code segments adapted to accommodate at least one new subfunction ordering table, whereby said module can be reprogrammed in accordance with a new desired timer function without rewriting of a plurality of said subfunction code segments;

presenting a function request to said program builder system so that said program builder system develops for incorporation into said timer operating program a subfunction ordering table in accordance with said function request input; and loading said timer-operating program into said timer module.

23. The method of claim 22, wherein said program builder system is at a customer's place of business, and wherein said loading step is executed by a customer.

24. The method of claim 22, wherein said program builder system is at a supplier's place of business, and wherein said loading step is executed by a supplier.

25. The method of claim 22, wherein said model number data page is made available to a customer at a customer's place of business.

26. The method of claim 22, wherein said model number data page is made available to a customer at a customer's place of business, and wherein said model number data page is electronically displayed.

27. The method of claim 22, wherein said model number data page is made available to a customer at a customer's place of business, and provided on at least one paper substrate.

28. A timer module comprising:

an output circuit; and a control circuit including a one-time programmable memory, said one-time programmable memory storing thereon an operating program for operating a timer, said program including:

a plurality of subfunction code segments each of said subfunction code segments corresponding to a different timer subfunction; and a subfunction ordering table determining an ordering of subfunctions for execution of said subfunction code segments, wherein said operating program includes a reprogramming status code section, wherein said reprogramming status code section is adapted to be read to determine a number of times said module has been reprogrammed.

29. The module of claim 28, wherein said module is adapted to receive a display-equipped device which displays an indicator indicating a number of times said timer module has been reprogrammed.

30. The module of claim 28, wherein said module is adapted for communication with a program builder system, wherein said subfunction ordering table is established using a program builder system in breakable communication with said timer module.

31. The module of claim 28, wherein said program includes reprogramming status code section, wherein said reprogramming status code section is adapted to be read to determine a number of times said module has been reprogrammed.

32. The module of claim 28, wherein said module is adapted for communication with a program builder system, wherein said subfunction ordering table is established using a program builder system in breakable communication with said timer module, said program builder system having stored thereon a lookup table correlating timer functions with lists of subfunctions.

33. The module of claim 28, wherein said program further includes at least one blank code segment for accommodating a new subfunction ordering table without requiring rewriting of any subfunction code segment of said program.

34. The module of claim 28, further comprising a single housing encapsulating said output circuit and said control circuit.

35. The module of claim 28, wherein said at least one of said plurality subfunction code segments is a subfunction selected from the group consisting of a "turn load on" and "turn load off" subfunction.

36. The module of claim 28, wherein said program further includes at least one timer operating parameter code segment, said operating parameter code segment, selected from the group consisting of a timer range code segment a fixed/adjustable code segment, and a fixed time delay code segment.

37. The module of claim 28, wherein said control circuit includes an 8 bit microprocessor.

38. A timer module comprising:

an output circuit; and a control circuit including a programmable memory, said programmable memory storing thereon an operating program for operating a timer, said program including a plurality of subfunction code segments each of said subfunction code segments corresponding to a different timer subfunction; and a subfunction ordering table determining an ordering of subfunctions for execution of said subfunction code segments, wherein said subfunction ordering table establishes an ordering for execution of said subfunction code segments so that a timer function is executed by execution of said ordering of subfunction code segments.

39. The module of claim 38, wherein said executed timer function is selected from the group consisting of a delay on make timer function, a delay on break timer function, a single shot timer function, a recycle timer function, and an interval timer function.

40. The module of claim 38, wherein said memory is a one-time programmable memory.

41. The module of claim 38, wherein said module is adapted for communication with a program builder system, wherein said subfunction ordering table is established using a program builder system in breakable communication with said timer module.

42. The module of claim 38, wherein said program includes reprogramming status code section, wherein said reprogramming status code section is adapted to be read to determine a number of times said module has been reprogrammed.

43. The module of claim 38, wherein said module is adapted for communication with a program builder system, wherein said subfunction ordering table is established using a program builder system in breakable communication with said timer module, said program builder system having stored thereon a lookup table correlating timer functions with lists of subfunctions.

44. The module of claim 38, wherein said program further includes at least one blank code segment for accommodating a new subfunction ordering table without requiring rewriting of any subfunction code segment of said program.

45. The module of claim 38, further comprising a single housing encapsulating said output circuit and said control circuit.

46. The module of claim 38, wherein said at least one of said plurality subfunction code segments is a subfunction selected from the group consisting of a "turn load on" and "turn load off" subfunction.

47. The module of claim 38, wherein said program further includes at least one timer operating parameter code segment, said operating parameter code segment selected from the group consisting of a timer range code segment, a fixed/adjustable code segment, and a fixed time delay code segment.

48. The module of claim 38, wherein said control circuit includes an 8 bit microprocessor.

49. A timer module comprising:
an output circuit; and
a control circuit including a programmable memory, said programmable memory storing thereon an operating program for operating a timer, said program including a plurality of subfunction code segments each of said subfunction code segments corresponding to a different timer subfunction; and
a subfunction ordering table determining an ordering of subfunctions for execution of said subfunction code segments,
wherein said operating program further includes at least one blank code segment for accommodating a new subfunction ordering table, without requiring rewriting of any subfunction code segment of said program.

50. The method of claim 49, wherein said memory is a one-time programmable memory.

51. The module of claim 49, wherein said module is adapted for communication with a program builder system, wherein said subfunction ordering table is established using a program builder system in breakable communication with said timer module.

52. The module of claim 49, wherein said program includes reprogramming status code section, wherein said reprogramming status code section is adapted to be read to determine a number of times said module has been reprogrammed.

53. The module of claim 49 wherein said module is adapted for communication with a program builder system, wherein said subfunction ordering table is established using a program builder system in breakable communication with said timer module, said program builder system having stored thereon a lookup table correlating timer functions with lists of subfunctions.

54. The module of claim 49, wherein said program further includes at least one blank code segment for accommodating a new subfunction ordering table, without requiring rewriting of any subfunction code segment of said program.

55. The module of claim 49, further comprising a single housing encapsulating said output circuit and said control circuit.

56. The module of claim 49, wherein said at least one of said plurality subfunction code segments is a subfunction selected from the group consisting of a "turn load on" and "turn load off" subfunction.

57. The module of claim 49, wherein said program further includes at least one timer operating parameter code segment, said operating parameter code segment selected from the group consisting of a timer range code segment, a fixed/adjustable code segment, and a fixed time delay code segment.

58. The module of claim 49, wherein said control circuit includes an 8 bit microprocessor.

59. A timer module comprising:
an output circuit; and
a control circuit including a programmable memory, said programmable memory storing thereon an operating program for operating a timer, said program including a plurality of subfunction code segments each of said subfunction code segments corresponding to a different timer subfunction; and
a subfunction ordering table determining an ordering of subfunctions for execution of said subfunction code segments,
wherein said program further includes at least one timer operating parameter code segment, said operating parameter code segment selected from the group consisting of a timer range code segment, a fixed/adjustable code segment, and a fixed time delay code segment.

60. The method of claim 59, wherein said memory is a one-time programmable memory.

61. The module of claim 59, wherein said module is adapted for communication with a program builder system, wherein said subfunction ordering table is established using a program builder system in breakable communication with said timer module.

62. The module of claim 59, wherein said program includes reprogramming status code section, wherein said reprogramming status code section is adapted to be read to determine a number of times said module has been reprogrammed.

63. The module of claim 59, wherein said module is adapted for communication with a program builder system, wherein said subfunction ordering table is established using a program builder system in breakable communication with said timer module, said program builder system having stored thereon a lookup table correlating timer functions with lists of subfunctions.

64. The module of claim 59, wherein program further includes at least one blank code segment for accommodating a new subfunction ordering table, without requiring rewriting of any subfunction code segment of said program.

65. The module of claim 59, further comprising a single housing encapsulating said output circuit, and said control circuit.

66. The module of claim 59, wherein said at least one of said plurality subfunction code segments is a subfunction selected from the group consisting of a "turn load on" and "turn load off" subfunction.

67. The module of claim 59, wherein said program further includes at least one timer operating parameter code segment, said operating parameter code segment selected from the group consisting of a timer range code segment a fixed/adjustable code segment, and a fixed time delay code segment.

68. The module of claim 59, wherein said control circuit includes an 8 bit microprocessor.

69. A timer module comprising:
an output circuit; and
a control circuit including a programmable memory, said programmable memory storing thereon an operating program for operating a timer, said program including
a plurality of subfunction code segments, each of said subfunction code segments corresponding to a different timer subfunction; and
a subfunction ordering table determining an ordering of subfunctions for execution of said subfunction code segments,
wherein a timer function is established by execution of said subfunction code segments in accordance with said ordering table, wherein said established timer function is a timer function selected from the group consisting of a delay on make timer function, a delay on break timer function, a single shot timer function, a recycle timer function, and an interval timer function.

70. The method of claim 69, wherein at least one function of said plurality of timer functions of said lookup table is a delay on make timer function.

71. The method of claim 69, wherein at least one function of said plurality of timer functions of said lookup table is a delay on break timer function.

72. The method of claim 69, wherein at least one function of said plurality of timer functions of said lookup table is a single shot timer function.

73. The method of claim 69, wherein at least one function of said plurality of timer functions of said lookup table is a recycle timer function.

74. The method of claim 69, wherein at least one function of said plurality of timer functions of said lookup table is an interval timer function.

75. The method of claim 69, wherein said memory is a one-time programmable memory.

76. The module of claim 69, wherein said module is adapted for communication with a program builder system, and wherein said subfunction ordering table is established using a program builder system in breakable communication with said timer module.

77. The module of claim 69, wherein said program includes reprogramming status code section, and wherein said reprogramming status code section is adapted to be read to determine a number of times said module has been reprogrammed.

78. The module of claim 69, wherein said module is adapted for communication with a program builder system, wherein said subfunction ordering table is established using a program builder system in breakable communication with said timer module, said program builder system having stored thereon a lookup table correlating timer functions with lists of subfunctions.

79. The module of claim 69, wherein said program further includes at least one blank code segment for accommodating a new subfunction ordering table without requiring rewriting of any subfunction code segment of said program.

80. The module of claim 69, further comprising a single housing encapsulating said output circuit and said control circuit.

81. The module of claim 69, wherein said at least one of said plurality subfunction code segments is a subfunction selected from the group consisting of a "turn load on" and "turn load off" subfunction.

82. The module of claim 69, wherein said program further includes at least one timer operating parameter code segment, said operating parameter code segment selected from the group consisting of a timer range code segment a fixed/adjustable code segment, and a fixed time delay code segment.

83. The module of claim 69, wherein said control circuit includes an 8 bit microprocessor.

84. A method for programming a plurality of processor-controlled timers, wherein each of said timers has a low-cost processor system, and wherein each timer is to have a different timer function, said method comprising the steps of:

(a) defining each of said different timer functions in terms of a set of timer subfunctions wherein each of said different timer functions is selected from the group consisting of a delay on make timer function, a delay on break timer function, a single shot timer function, a recycle timer function, and an interval timer function;

(b) creating a list of timer subfunctions, said list of timer subfunctions comprising the sum of all subfunctions defined in step (a);

(c) developing a program code segment for each of said timer subfunctions of said list created in step (b);

(d) loading each program code segment developed in step (c) into each of said plurality of timers; and (e) storing a subfunction ordering table into each of said plurality of timers.

85. The method of claim 84, wherein said loading step is carried out by a customer.

86. The method of claim 84, wherein said loading step is carried out by a supplier.

87. The method of claim 84, wherein said establishing step further includes the step of making available a model number data page correlating timer functions with information respecting said timer functions, and wherein said selecting step is executed in accordance with information of said model number data page.

88. The method of claim 84, wherein said establishing step further includes the step of making available an electronically displayed model number data page correlating timer functions with information respecting said timer functions, and wherein said selecting step is executed in accordance with information of said model number data page.

89. The method of claim 84, wherein at least one subfunction defined more than once in step (a) is expressed in said list created in step (b) less than its number of incidence.

90. The method of claim 84, wherein said storing step includes the step of leaving a blank code segment in at least one of said timers for accommodating a new subfunction ordering table so that said at least one timer can be reprogrammed to perform a new function without requiring rewriting any of said plurality of subfunction code segments.

91. The method of claim 84, wherein said developing step includes the step of developing a code segment selected from the group consisting of a "turn load on" code input, and a "turn load off" code segment.

92. The method of claim 84, wherein said method further comprises the step of programming a reprogramming status code segment into each of said plurality of timers.

93. The method of claim 84, wherein said method further comprises the step of programming a reprogramming status code segment into each of said plurality of timers, and wherein said method includes the step of configuring said reprogramming status code segment of each of said timers so that a reprogramming status or said each timer can be changed by over-writing an "all zero" line of code into said reprogramming status code segment.

94. A method for programming a plurality of processor-controlled timers, wherein each of said timers has a low-cost processor system, and wherein each timer is to have a different timer function, said method comprising the steps of:

(a) defining each of said different timer functions in terms of a set of timer subfunctions;

(b) creating a list of timer subfunctions, said list of timer subfunctions comprising the sum of all subfunctions defined in step (a);

(c) developing a program code segment for each of said timer subfunctions of said list created in step (b);

(d) loading each program code segment developed in step (c) into each of said plurality of timers;

(e) making available a model number data page correlating timer functions with information respecting said timer functions;

(e) selecting a subfunction ordering table for input into at least one of said timers utilizing information of said model number data page; and (f) storing a subfunction ordering table into each of said plurality of timers.

95. The method of claim 94, wherein said loading step is carried out by a customer.

96. The method of claim 94, wherein said loading step is carried out by a supplier.

97. The method of claim 94, wherein said loading step is carried out by a customer, and wherein said model number data page is made available to a customer.

98. The method of claim 94, wherein said loading step is carried out by a supplier and wherein model number data page is made available to a customer.

99. The method of claim 94, wherein at least one subfunction defined more than once in step (a) is expressed in said list created in step (b) less than its number of incidence.

100. The method of claim 94, wherein said establishing step further includes the step of making available a model number data page correlating timer function with information respecting said timer functions, and wherein said selecting step is executed in accordance with information of said model number data page.

101. The method of claim 94, wherein said establishing step further includes the step of making available an electronically displayed model number data page correlating timer function with information respecting said timer functions, and wherein said selecting step is executed in accordance with information of said model number data page.

102. The method of claim 94, wherein said storing step includes the step of leaving a blank code segment in at least one of said timers for accommodating a new subfunction ordering table so that said at least one timer can be reprogrammed to perform a new function without requiring rewriting any of said plurality of subfunction code segments.

103. The method of claim 94, wherein said developing step includes the step of developing a code segment selected from the group consisting of a "turn load on" code input, and a "turn load off" code segment.

104. The method of claim 94, wherein said method further comprises the step of programming a reprogramming status code segment into each of said plurality of timers.

105. The method of claim 94, wherein said method further comprises the step of programming a reprogramming status code segment into each of said plurality of timers, and wherein said method includes the step of configuring said reprogramming status code segment of each of said timers so that a reprogramming status of said each timer can be changed by over-writing an "all zero" line of code into said reprogramming status code segment.

\* \* \* \* \*